US006937348B2

(12) United States Patent
Geng

(10) Patent No.: US 6,937,348 B2
(45) Date of Patent: *Aug. 30, 2005

(54) METHOD AND APPARATUS FOR GENERATING STRUCTURAL PATTERN ILLUMINATION

(75) Inventor: Z. Jason Geng, Rockville, MD (US)

(73) Assignee: Genex Technologies, Inc., Kensington, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 10/426,083

(22) Filed: Apr. 28, 2003

(65) Prior Publication Data

US 2003/0223083 A1 Dec. 4, 2003

Related U.S. Application Data

(63) Continuation-in-part of application No. 09/771,531, filed on Jan. 29, 2001.
(60) Provisional application No. 60/375,934, filed on Apr. 26, 2002, and provisional application No. 60/178,695, filed on Jan. 28, 2000.

(51) Int. Cl.[7] .......................... G01B 11/24; G01B 11/30
(52) U.S. Cl. .................. 356/603; 356/610; 356/602
(58) Field of Search ................. 356/121, 138, 356/147, 622, 623, 602, 603, 604, 606, 610, 616, 617, 625, 626, 638, 640; 348/47, 139, 136; 353/30–34

(56) References Cited

U.S. PATENT DOCUMENTS

| | | | | |
|---|---|---|---|---|
| 4,088,400 A | * | 5/1978 | Assouline et al. | 353/20 |
| 6,147,760 A | * | 11/2000 | Geng | 356/602 |
| 6,341,016 B1 | * | 1/2002 | Malione | 356/603 |
| 6,356,298 B1 | * | 3/2002 | Abe et al. | 348/47 |
| 6,552,754 B1 | * | 4/2003 | Song et al. | 348/750 |
| 6,636,310 B1 | * | 10/2003 | Ben-Dov et al. | 356/601 |
| 6,700,669 B1 | * | 3/2004 | Geng | 356/603 |
| 2003/0002052 A1 | * | 1/2003 | Hoffmann | 356/603 |
| 2003/0016366 A1 | * | 1/2003 | Takeda et al. | 356/604 |
| 2003/0164952 A1 | * | 9/2003 | Deichmann et al. | 356/603 |

* cited by examiner

*Primary Examiner*—Judy Nguyen
*Assistant Examiner*—Andrew Sever
(74) *Attorney, Agent, or Firm*—Steven L. Nichols; Paul W. Fish; Rader, Fishman & Grauer PLLC

(57) ABSTRACT

A three-dimensional imaging method and system illuminates an object to be imaged with a light pattern that is formed from two or more light sub-patterns. The sub-patterns can each encompass the visible light spectrum or can be spatially varying intensity sub-patterns that each correspond to a red, green, or blue component. The light pattern is generated by a slotted planar member or an optical filter.

46 Claims, 23 Drawing Sheets

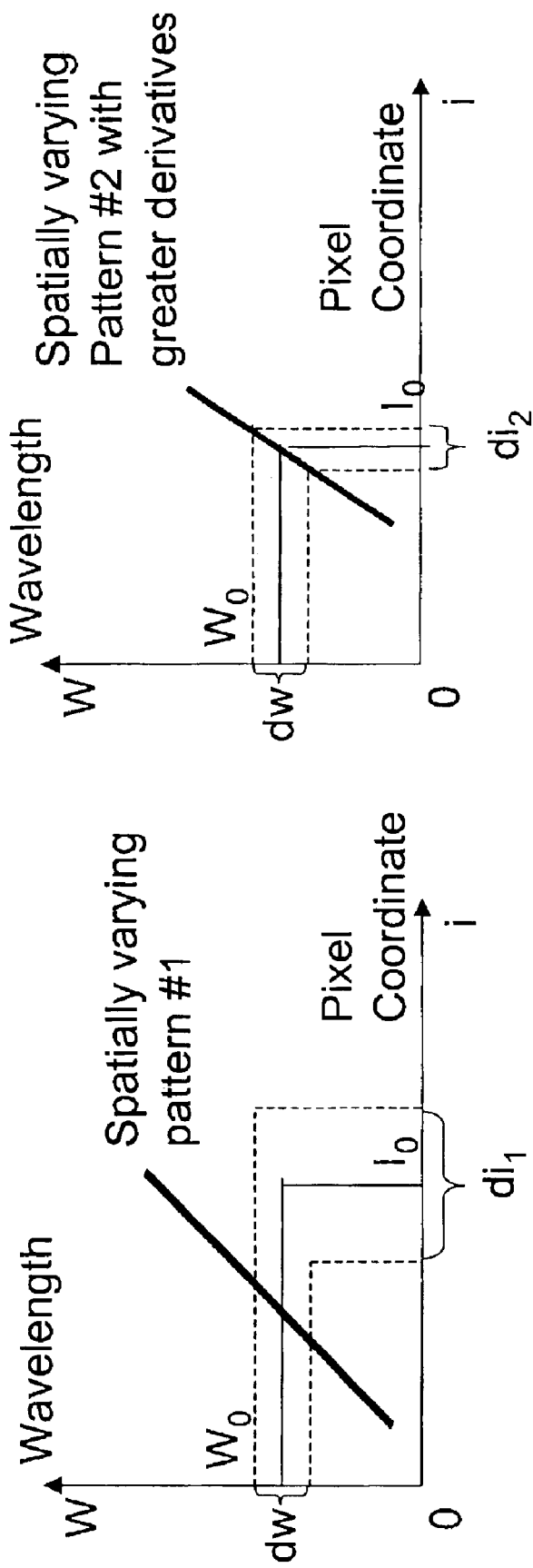

Graphical Illustration of the Lookup Table: Projection Angle v.s. Wavelength

Projection of Individual Color Bands

Composite of Individual color projection patterns produces the Multi-Rainbow Projection(MRP)

Optical Layout of Primary Light Source

METHOD AND APPARATUS FOR GENERATING STRUCTURAL PATTERN ILLUMINATION

REFERENCE TO RELATED APPLICATIONS

This application claims the benefit under 35 U.S.C. §119(e) of prior U.S. provisional patent application No. 60/375,934, filed Apr. 26, 2002, the disclosure of which is incorporated herein by reference in its entirety. This application is also a continuation-in-part of previous U.S. patent application Ser. No. 09/771,531, filed Jan. 29, 2001, the disclosure of which is incorporated herein by reference in its entirety. U.S. patent application Ser. No. 09/771,531 claims the benefit of U.S. Provisional Appln. No. 60/178,695, filed Jan. 28, 2000, the disclosure of which is incorporated herein by reference in its entirety.

BACKGROUND

A three dimensional surface profile imaging method and apparatus described in U.S. Pat. No. 5,675,407 ("the '407 patent"), the disclosure of which is incorporated herein by reference in its entirety, conducts imaging by projecting light through an optical filter, such as linear variable wavelength filter (LVWF), thereby projecting light having a known, spatially distributed wavelength spectrum on the objects being imaged. The LVWF is a rectangular optical glass plate coated with a color-filtering film that gradually varies in color, (i.e., wavelength). If the color spectrum of a LVWF is within the visible light region, one edge of the filter rectangle may correspond to the shortest visible wavelength (i.e. blue or violet) while the opposite edge may correspond to the longest visible wavelength, (i.e. red). The wavelength of light passing through the coated color-filtering layer is linearly proportional to the distance between the position on the filter glass where the light passes and the blue or red edge. Consequently, the color of the light is directly related to the angle θ, shown in FIG. 1, at which the light leaves the rainbow projector and LVWF.

Referring to FIG. 1 in more detail, the imaging method and apparatus is based on the triangulation principle and the relationship between a light projector (100) having the LVWF, a camera (102), and the object being imaged (104). As shown in FIG. 1, a triangle is uniquely defined by the angles theta (θ) and alpha (α), and the length of the baseline (B). With known values for θ, α, and B, the distance (i.e., the range R) between the camera (102) and a point Q on the object's surface can be easily calculated. Because the baseline B is predetermined by the relative positions of the light projector (100) and the camera (102), and the value of α can be calculated from the camera's geometry, the key to the triangulation method is to determine the projection angle, θ, from an image captured by the camera (102) and more particularly to determine all θ angles corresponding to all the visible points on an object's surface in order to obtain a full-frame three-dimensional (3D) image in one snapshot.

FIG. 2 is a more detailed version of FIG. 1 and illustrates the manner in which all visible points on the object's surface (104) are obtained via the triangulation method. As can be seen in the Figure, the light projector (100) generates a fan beam of light (200). The fan beam (200) is broad spectrum light (i.e., white light) which passes through the LVWF to illuminate one or more three-dimensional objects (104) in the scene with a pattern of light rays possessing a rainbow-like spectrum distribution. The fan beam of light (200) is composed of multiple vertical planes of light, or "light sheets", each plane having a given projection angle and wavelength. Because of the fixed geometric relationship among the light source (100), the lens of the camera (102), and the LVWF, there exists a one-to-one correspondence between the projection angle (θ) of the vertical plane of light and the wavelength (λ) of the light ray. Note that although the wavelength variations are shown in FIG. 2 to occur from side to side across the object (104) being imaged, it will be understood by those skilled in the art that the variations in wavelength could also be made from top to bottom across the object (104) being imaged.

The light reflected from the surface of the object (104) is then detected by the camera (102). If a visible spectrum range LVWF (400–700 nm) is used, the color detected by the camera pixels is determined by the proportion of its primary color components, i.e., the Red, Green, and Blue components (RGB). The color spectrum of each pixel has a one-to-one correspondence with the projection angle (θ) of the plane of light due to the fixed geometry of the camera (102) lens and the LVWF characteristics. Therefore, the color of light received by the camera (102) can be used to determine the angle θ at which that light left the rainbow light projector (100). Other spectrum ranges can also be used in similar fashion.

As described above, the angle α is determined by the physical relationship between the camera (102) and the coordinates of each pixel on the camera's imaging plane. The baseline B between the camera's 102 focal point and the center of the cylindrical lens of the light projector (100) is fixed and known. Given the value for angles α and θ, together with the known baseline length B, all necessary information is provided to easily determine the full frame of three-dimensional range values (x,y,z) for any and every visible spot on the surface of the objects seen by the camera (102).

As shown in FIG. 3, given the projection angle θ, the three-dimensional algorithm for determining the (x,y,z) coordinates of any surface spot Q(x,y,z) on a three-dimensional object is given below based on the following triangulation principle:

$$x = \frac{B}{f * ctg\theta - u} * u, \quad y = \frac{B}{f * ctg\theta - u} * v, \quad z = \frac{B}{f * ctg\theta - u} * f \quad (1)$$

As a result, the three-dimensional imaging system described above can capture full-frame, high spatial resolution three-dimensional images using a standard camera, such as a charge coupled device camera, in real time without relying on any moving parts. Further, because the imaging system does not rely on a laser, it does not pose any hazard to the eyes when used in clinical applications. Also, because the wavelength of the light projected onto the object surface continuously varies, there is no theoretical limitation on the measurement accuracy that can be achieved by the system. The actual accuracy of a specific system will depend on system implementation and will be affected primarily by limiting factors such as the optical system design, the quality and resolution of the camera, light spectral emission of the light source projector; noise level and resolution of the frame grabber, calibration algorithms, and the three-dimensional imaging processing algorithms.

To avoid allowing the ambient light on the object being imaged from affecting the imaging results, the system may obtain an image of the object under normal light conditions before projecting the filtered light onto the object. The image obtained under normal light conditions is then subtracted from the image obtained under LVWF light conditions to eliminate the effects of the ambient light on the image.

With reference to FIGS. 1 and 3, the triangulation algorithm used in the imaging system is based on the following formula:

$$R = \frac{\sin\theta}{\sin\alpha}B, \quad (2)$$

where $(x_p, y_p)$ is the location of the rainbow light projector, $(x_c, y_c)$ is the location of imaging sensor, B is the baseline between the rainbow projector and the imaging sensor (CCD), $\alpha = \pi - \theta - B$, O is a surface point on the object in the scene, and R is the three-dimensional range, that is, the distance between $(x_c, y_c)$ and O.

Note that all of the variables, $\theta$, $\alpha$, and B, in the equation (2) may introduce error in the three-dimensional range calculation. In the following error sensitivity analysis, considered with reference to FIG. 4, it is assumed that the coordinate of the camera's focal point in the world coordinate system can be obtained precisely through camera calibration. The full derivative of the range R is given by:

$$dR = \left[\frac{\sin\theta\cos\alpha}{-\sin^2\alpha}b\right]d\alpha + \left[\frac{\cos\theta}{\sin\alpha}b\right]d\theta + \left[\frac{\sin\theta}{\sin\alpha}b\right]db \quad (3)$$

The $d\alpha$, $d\theta$, and $db$ are all functions of the position error of the light projector $(dx_p, dz_p)$ and the color mismatch $dx$. Notice that:

$$b = \sqrt{(x_c - x_s)^2 + (z_c - z_s)^2}, \quad (4)$$

$$\beta = -\tan^{-1}\frac{z_c - z_p}{x_c - x_p} + \tan^{-1}\frac{z_c}{x_c - x}, \text{ and}$$

$$\theta = \tan^{-1}\frac{z_c - z_p}{x_c - x_p} + \tan^{-1}\frac{z_p}{x - x_p}$$

Therefore $$db = \frac{(x_p - x_c)dx_p + (z_p - z_c)dz_p}{b} \quad (5)$$

$$d\beta = \frac{(x_{cf} - x_p)dz_p + (z_p - z_c)dx_p}{b^2}$$

$$d\theta = \frac{(x_p - x_c)dz_p + (z_c - z_p)dx_p}{b} - \frac{z_p}{(x - x_p)^2 + z_p^2}dx$$

To simplify the analysis, the effect of a mismatch error in the world coordinate, dx, caused by imaging sensor's spectral noise can be indicated as follows:

$$dR = \left[\frac{\cos\theta}{\sin\alpha}b\right]\frac{z_p}{(x - x_p)^2 + z_p^2}dx \quad (6)$$

The linear relationship between the mismatch error dx in the world coordinate and the mismatch error in CCD camera's pixel coordinate, di, allows approximation of dx and di as if they are the same order of magnitude, resulting in the expression:

$$dx = k*di \quad (7)$$

where k is a constant. From this expression, the range error in terms of the color mismatch error in CCD pixel coordinate can be expressed as follows:

$$dR = \left[\frac{\cos\theta}{\sin\alpha}b\right]\frac{z_p}{(x - x_p)^2 + z_p^2}*k*di \quad (8)$$

In the imaging system shown in FIGS. 1 and 2, the continuously varying wavelength pattern obtained via the light projector (100) and the LVWF 101 is projected spatially onto surfaces of a three-dimensional object or scene (104). There is a one-to-one corresponding relationship between the wavelength of the projected light sheet, $\omega$, and its projection angle, $\theta$. Based on this one-to-one relationship, a $(\omega, \theta)$ lookup table can be established for the color matching operation. An image sensor device (such as the CCD camera (102)) that collects the reflection from object's surfaces also provides wavelength information for each pixel in an image, enabling the determination of the projection angle $\theta$ corresponding to each image pixel through the color matching operation based on the $(\omega, \theta)$ lookup table.

The accuracy of the color match operation, of course, affects the accuracy of the three-dimensional surface measurement. Referring to FIGS. 5a and 5b, the accuracy of the color match is significantly determined by the characteristics of the projected wavelength-varying illumination pattern. More particularly, the system has a signal to noise ratio (S/N=c), where the noise is a catch-all term that characterizes all undesirable effect in the system to reduce the fidelity of the spectral signal (i.e., wavelength). Due to the existence of the noise, mismatch error (denoted as dw) occurs.

As shown in FIGS. 6a and 6b, for the same magnitude level of dw, if we use a spatially varying projection pattern that has a greater derivative, a smaller mismatch error in the pixel coordinate, denoted as di, occurs due to the increased slope caused by the larger derivative:

$$di_2 < di_1. \quad (9)$$

Using Equ. (8) in Equ. (9), the expression becomes:

$$dR_2 < dR_1. \quad (10)$$

The above expressions suggest that mismatch errors can be reduced by using a spatially varying projection pattern that has a large variation rate and therefore a large derivative.

As noted above, the imaging system projects a light pattern that could be described as a "single rainbow projection" pattern because the pattern ranges over the visible light spectrum a single time. This type of pattern, however, has a variation rate that depends on numerous factors, including the field of view of the camera/image sensor, the distance between the light projector and the object being imaged, as well as other factors. As a result, it is difficult to adjust the spectral variation rate of the single rainbow projection pattern to fit the accuracy requirements of many three-dimensional imaging tasks.

SUMMARY

Accordingly, the present invention is directed to a system and method that generates a light pattern that contains multiple cycles of light spectra or sub-patterns. In one embodiment, the light pattern includes two or more cycles of spectra of visible or infrared light, arranged contiguously with each other. The light pattern may also be generated by sequentially emitting two of more sub-patterns.

In another embodiment of the invention, the multiple spectra light pattern is generated by projecting the light from the light source through a planar member, such as a slotted panel, that is used in conjunction with color filtering to produce a pattern containing multiple iterations of the visible color spectrum. The multiple spectra used to illuminate the object being imaged improves resolution and measurement accuracy by reducing color mismatch error.

BRIEF DESCRIPTION OF THE DRAWINGS

FIGS. 5a and 5b are graphs comparing the slopes of the illumination pattern on measurement accuracy.

DETAILED DESCRIPTION

Figure 1:
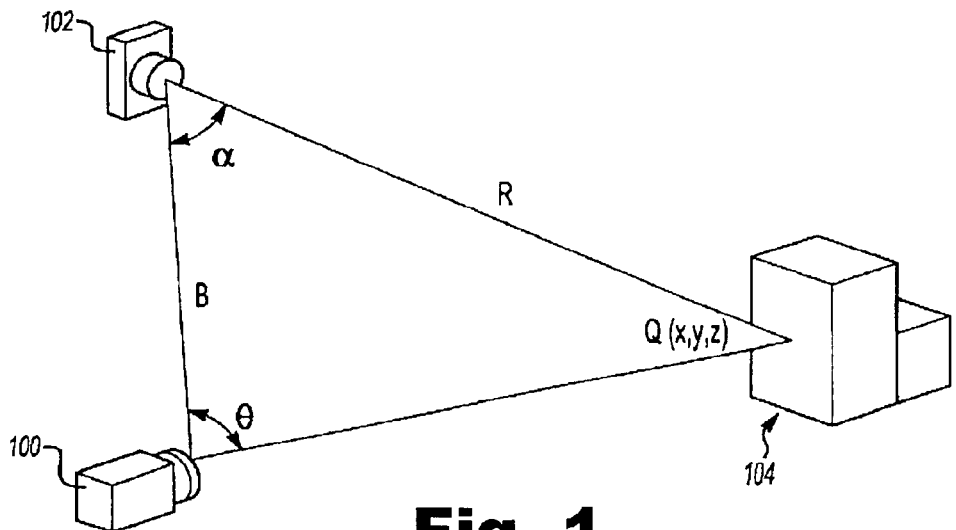
FIG. 1 is a simplified diagram illustrating a triangulation principle used in the present invention.
Figure 2:
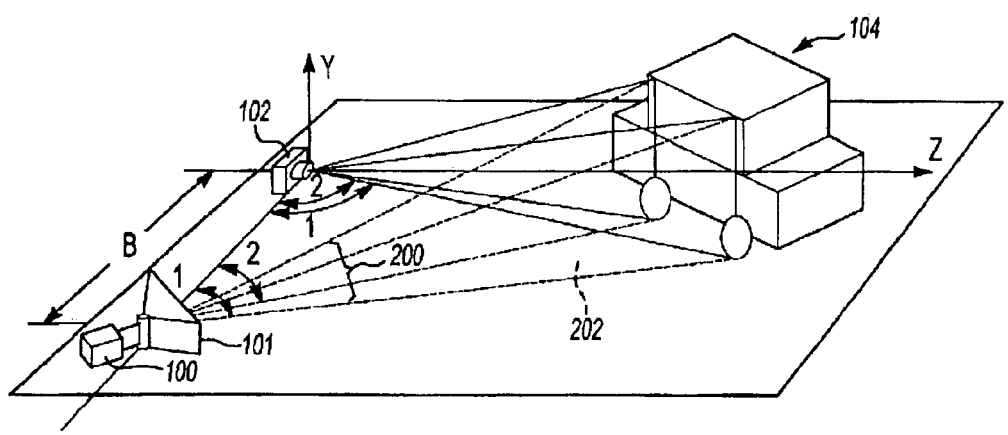
FIG. 2 is a representative diagram of the components used by the inventive system.
Figure 3:
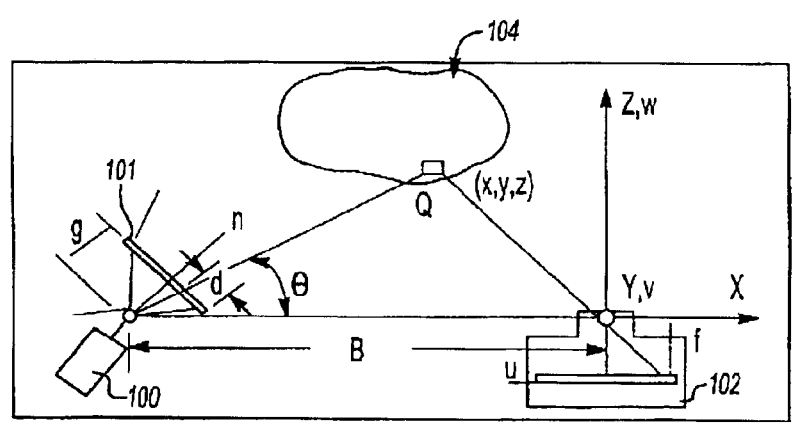
FIG. 3 is a plan view of the system shown in FIG. 2.
Figure 4:
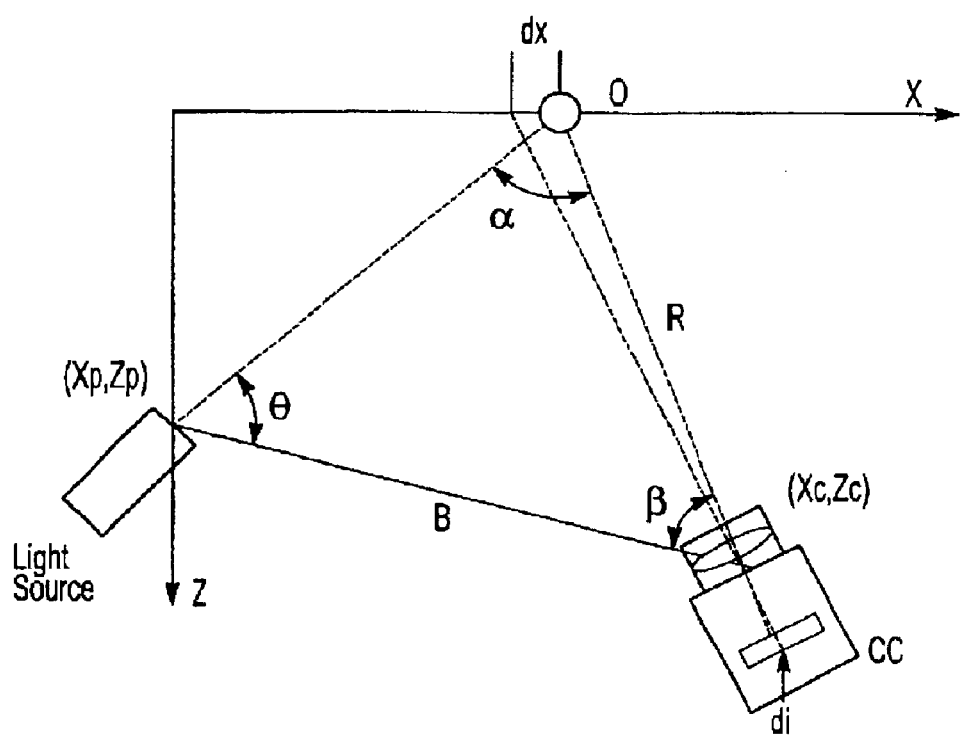
FIG. 4 is a representative diagram illustrating the effect of errors in range calculation.
Figure 6A:
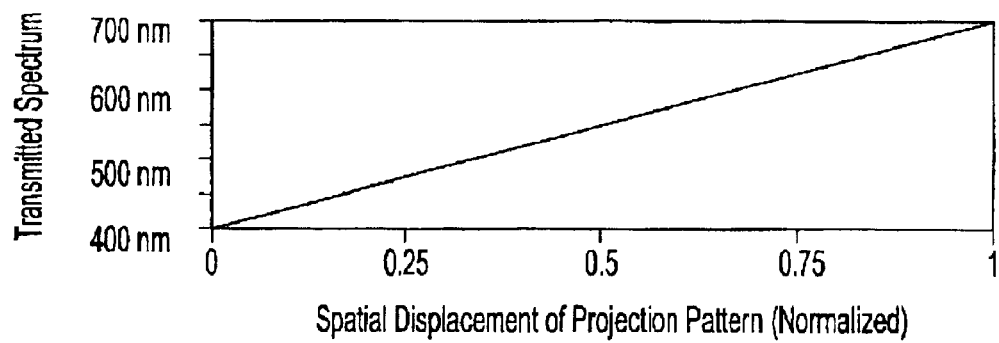
FIGS. 6a and 6b are light pattern spatial displacement graphs corresponding to embodiments of the present invention.
Figure 6B:
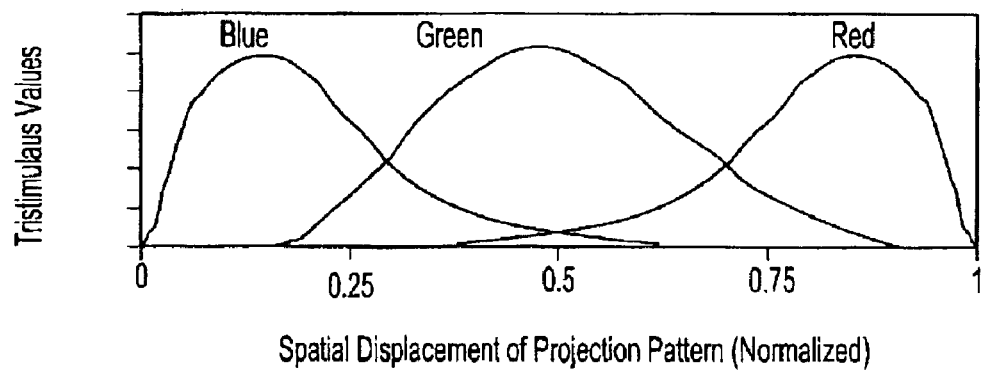

FIGS. 6a and 6b illustrate one manner in which the light projection pattern can be modified to improve resolution and measurement accuracy. FIGS. 6a and 6b assume that the light pattern is a single rainbow projection pattern. As explained above, the light pattern contains red, green and blue (RGB) components. In one embodiment of the invention, the intensities of the RGB components in the light pattern are modulated so that the intensity of each R, G, B component varies between high and low points, i.e. from a peak to a valley, and forms multiple cycles of pattern variation. The locations of the peak-valley points for the R, G, and B sub-patterns are spread over the spatial period of the light pattern, as shown in FIG. 6b. Notice that the distribution of R, G, and B does not need to be evenly spaced across the spatial period.

Because this embodiment uses a single rainbow projection pattern as the light pattern, the one-to-one correspondence between the wavelength of a light sheet in the light pattern and its projection angle still applies in this embodiment.

Figure 7A:
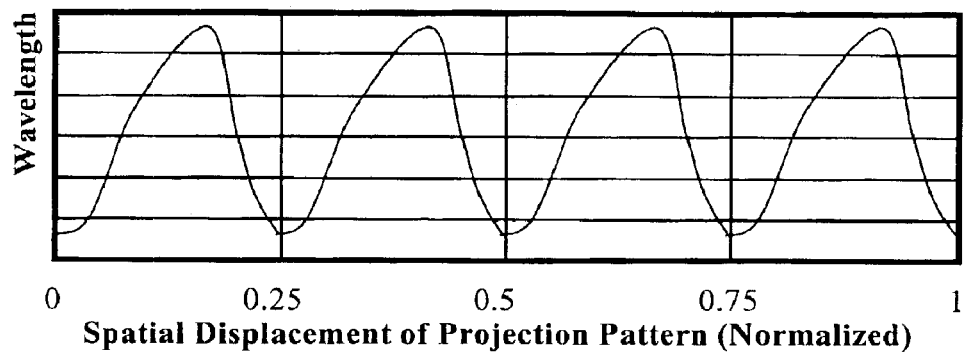
FIGS. 7a, 7b and 7c illustrate a multiple spectra light projection pattern according to embodiments of the present invention.
Figure 7B:
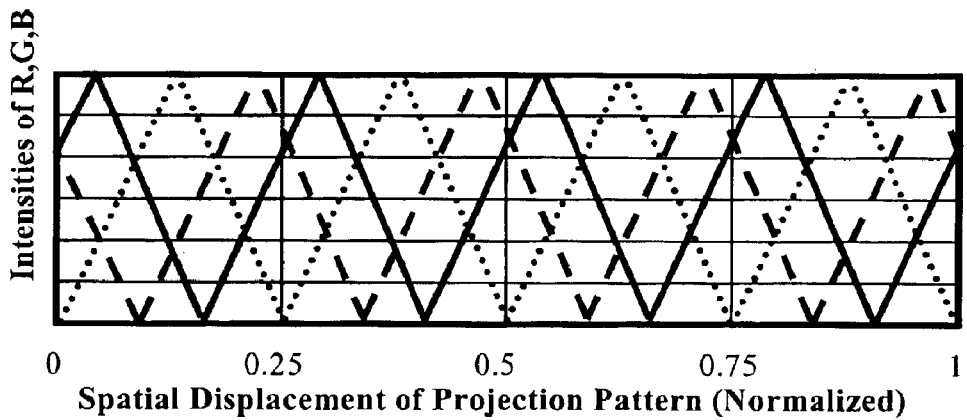
Figure 7C:
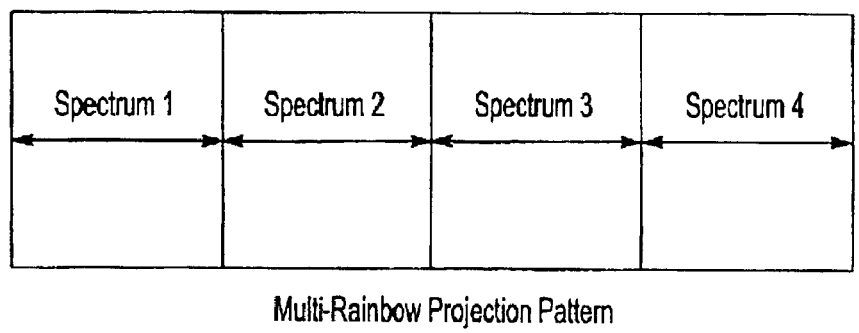

Referring now to FIGS. 7a through 7c, the light pattern from the light projector does not have to be limited to a single spectrum, where a one-to-one correspondence between a given wavelength and a given projection angle applies. Instead, the light pattern may include multiple cycles of spectra, such as multiple visible light spectra, such that a given wavelength from the light projector could be generated and transmitted in several projection directions, i.e. at several projection angles. This will be referred to as a "multiple rainbow projection" pattern, even though the spectra is not limited to the visible rainbow light spectrum. Because a given wavelength will no longer have a one-to-one correspondence with a projection angle, the look-up table will contain two or more projection angles for each wavelength (a one-to-many relationship). As a result, the multiple rainbow projection system requires an additional procedure to select the correct projection angle for a given wavelength.

Figure 8:
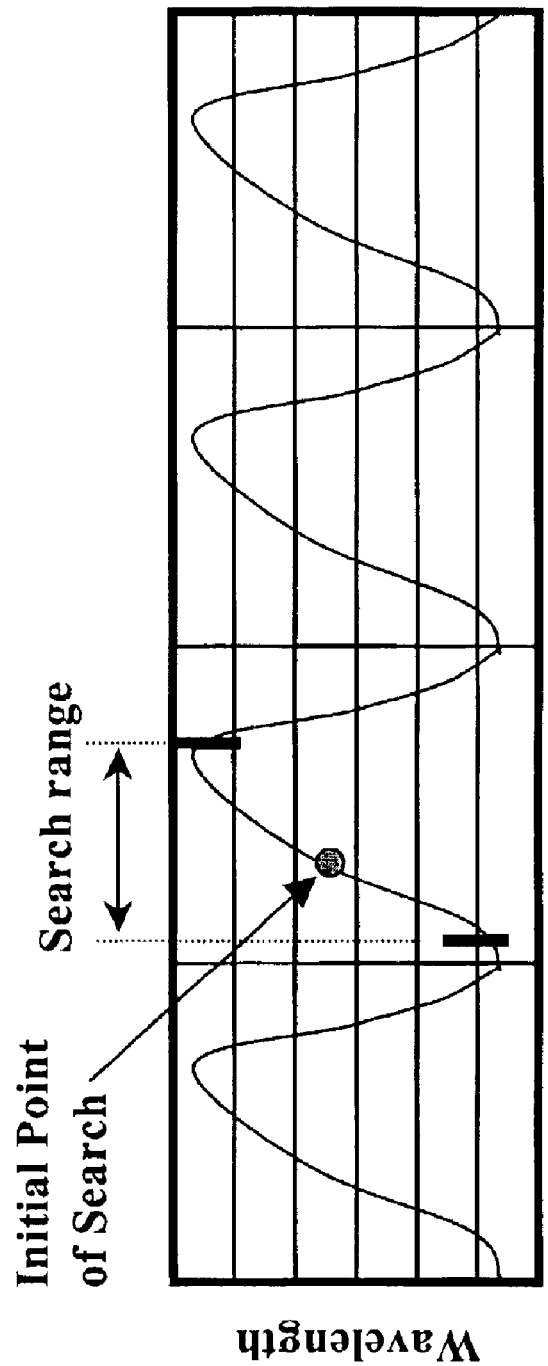
FIG. 8 is a representative diagram of the manner in which a search for a match between projection angle and wavelength is conducted when multiple spectra are used as in embodiments of the present invention.
Figure 9:
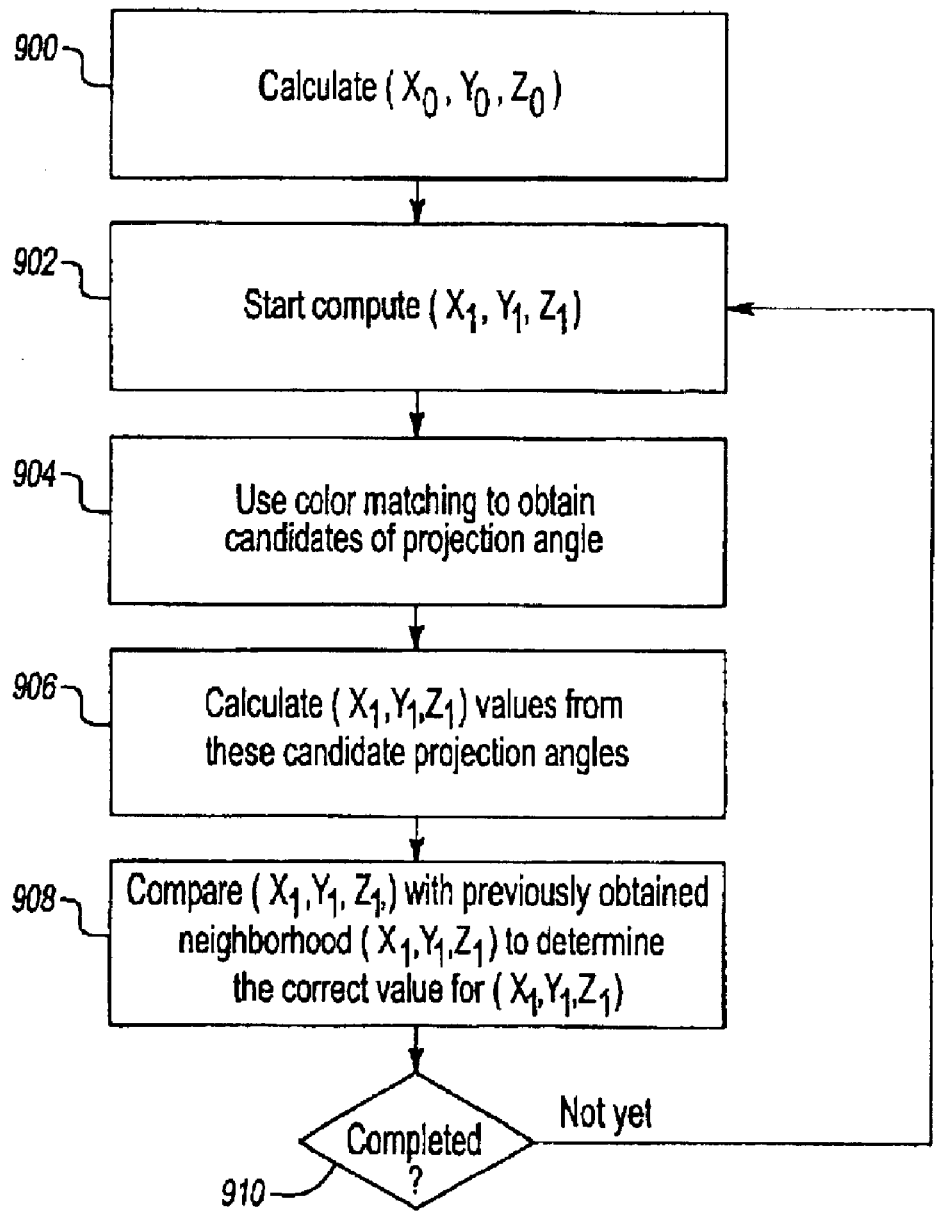
FIG. 9 is a flowchart of an adaptive initial point calculation method used in embodiments of the present invention.

FIGS. 8 and 9 is a graph and flowchart, respectively, outlining the procedure for conducting color matching for a one-to-many lookup table that contains multiple projection angles for a given wavelength. To avoid any mismatching from an incorrect projection angle selection, the method shown in FIG. 9 can be used to reduce any ambiguities.

First, adaptive control can be used to determine the initial condition in the search. More particularly, an adaptive initial point calculation mechanism may be used to ensure that the initial point at which the iterative search method begins is at least somewhat close to the correct result, particularly because the final result of iterative processes tends to depend on the selected initial condition. By limiting the search range, as shown in FIG. 8, within one spectrum in the multiple-spectrum light pattern, the likelihood of a correct color match is greatly increased.

One method of increasing the chance for having a good initial point in a search is to use an adaptive initial point calculation mechanism. The initial point of the search is determined by a correct match point in the search of a neighboring pixel. The underlying assumption here is that most portions of the surface of a physical object being imaged are continuous. Thus the projected, i.e., reflected, color is similar for neighboring portions of the object, and therefore the initial projection angle value should also be very similar.

As can be seen in FIG. 9, the process starts by determining origin point coordinates ($x_0$, $y_0$, $z_0$) at step (900). This point can be, for example, the upper right-hand pixel in the image. To compute the correct value for the desired point ($x'_i$, $y'_i$, $z'_i$) at step (902), the inventive system uses color matching to obtain projection angle candidates at step (904). For example, if the object is being illuminated with two identical rainbow spectra are arranged horizontally, i.e., right and left, with respect to each other, it can be assumed that the light resulting in the upper right-hand pixel of the image taken results from light in the right-hand spectrum as reflected by the object. Therefore, to identify the angle at which that light was originally emitted, θ, the wavelength of that light is matched to the angle at which that wavelength is being emitted in the right-hand, as opposed to the left-hand, rainbow spectrum. Once this angle is identified, the value for ($x'_i$, $y'_i$, $z'_i$) obtained at step (906) is compared with previously obtained neighborhood point ($x_{i-1}$, $y_{i-1}$, $z_{i-1}$) to determine the correct value for ($x_i$, $y_i$, $z_i$) at step (908). If the iteration process is determined to be complete at step (910), then the process ends. Otherwise, another iteration is conducted to refine the determination of the value of ($x_i$, $y_i$, $z_i$).

Note that although the look-up table for a multiple rainbow projection system has multiple projection angles associated with any given wavelength when the light pattern is viewed as a whole, the system restricts the search space in the color matching operation within a smaller range (e.g., within one sub-pattern) so that, as a practical matter, there is a one-to-one correspondence between the wavelength and the projection angle when the search is restricted to within the sub-pattern.

Figure 10:
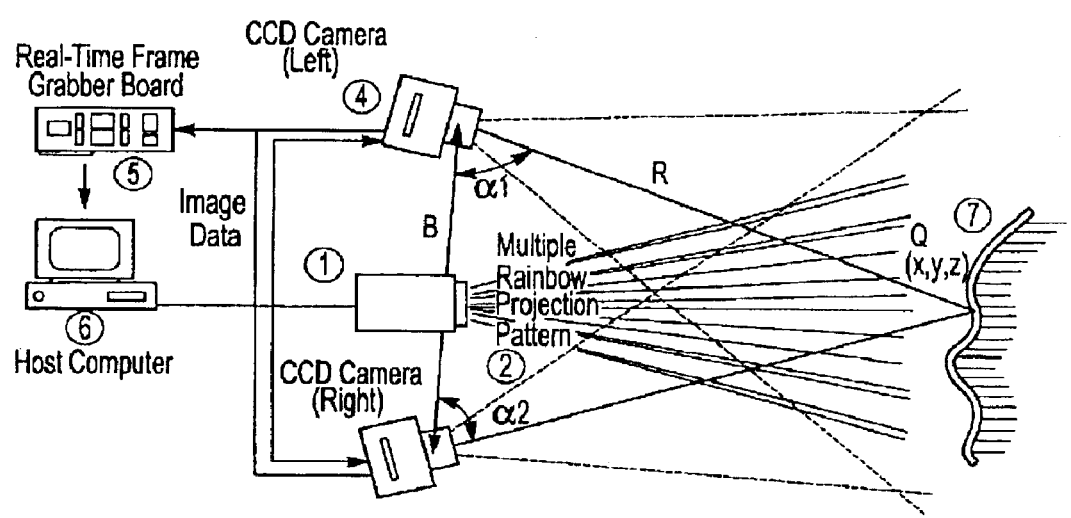
FIG. 10 illustrates another embodiment of the inventive system in which multiple spectra are incorporated in a light pattern projected onto an object or scene being imaged.

Although all of the above examples assume that there is only one camera or image sensor used to capture images of the illuminated object, multiple cameras can also be used to capture multiple rainbow projection pattern data. Referring to FIG. 10, the light projector, marked ①, generates the multiple rainbow projection patterns, marked ②, to lighten the scene containing 3D objects of interest, marked ⑦. The reflected light is detected by a pair of color CCD cameras, marked ③ and ④. The images, which contain both intensity and color components, will be grabbed by a real time frame grabber board, marked ⑤, into a host computer, marked ⑥, to perform pixel-to-pixel color matching and triangulation calculation, based on the similarity of color patterns and intensity variation in the neighborhood of pixels in stereo image pairs.

The color spectrum of pixels on the captured images is determined by the proportion of Red, Green and Blue components (RGB) associated with the individual pixel. As a result, pixel-to-pixel registration can be easily performed based on matching the color components of counterparts. Because the length of the baseline B between the two cameras is known, and the geometrical and optical parameters of two cameras can be obtained from a prior calibration procedure, the locations of a pair of corresponding pixels in a stereo image pair provide sufficient information to determine viewing angles α1 and α2. The range values, R, associated with each pixel between a camera and surface points can be obtained using a straightforward triangulation:

$$R = B \frac{\sin(\alpha_2)}{\sin(\alpha_1 + \alpha_2)} \tag{11}$$

Thus, a full frame of a three-dimensional image can be obtained from a single snap shot, and a stream of three-dimensional images can be generated at the camera's frame rate (e.g., 30 frames per second or higher).

By using multiple cameras in conjunction with the multiple rainbow projection system, three-dimensional measurement accuracy is greatly improved, particularly when measuring objects and scenes that do not have many distinguishing surface features. More particularly, the stereo matching and triangulation methods used in this embodiment reduces the dependence of distinguishing features, such as edges and corners, on an object's surface in conducting the measurement.

Figure 11:
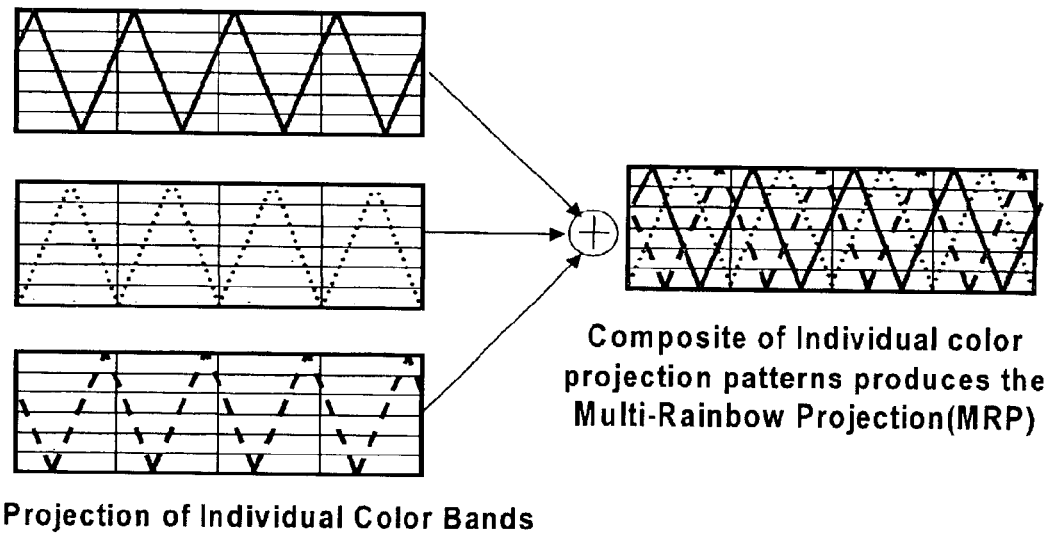
FIG. 11 illustrate a light pattern and method that is generated from a composite image of multiple sub-patterns according to another embodiment of the invention.
Figure 12:
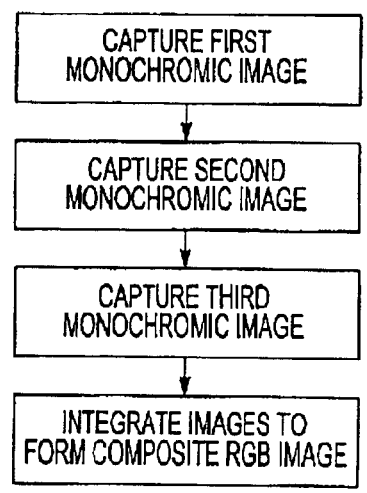
FIG. 12 is flowchart detailing the method of forming a light pattern from a composition of sub-patterns as shown in FIG. 11.

Referring now to FIGS. 11 and 12, the inventive system is not limited to systems using a color camera or color images, but can also be implemented using a monochromic camera and monochromic projection patterns. For example, a multiple rainbow projection pattern can be represented as a combination of three individual bands of color, namely red, green, and blue (or other colors, if a different color space is defined). Each band of color components (R, G, B) can be projected sequentially so that a monochromic camera can collect the reflected images for each color component upon each projection. These images are then combined to form a composite "color" image, which is equivalent to the color image produced by a color camera under the multiple rainbow projection, as illustrated in FIG. 11.

FIG. 12 outlines the method corresponding to the sequential images illustrated in FIG. 11. The resulting composite image can be used like any color image and can be captured by systems employing one camera or multiple cameras. Using a monochromic camera to obtain the color image generates high-resolution images using lower-cost, less complex equipment. However, because multiple images need to be obtained of any given scene to generate a full-frame three-dimensional image, this embodiment is most suitable for acquiring images of static or slowly moving objects.

Note that the above examples assumed that an optical filter, i.e., an LWVF, is used to produce the illumination pattern, such as a rainbow pattern, on the object or scene being imaged. In this type of system the light from the light source is projected through the LWVF to generate the light pattern. The quality of the light pattern, however, depends greatly on the quality of the filter, which can be expensive and difficult to produce.

Consequently, it would be preferable to have a system in which an LWVF is not required to generate the multi-rainbow pattern. It would also preferable to have a system in which the multi-rainbow pattern can be created in a single shot without having to exposing the object or scene of interest to a sequence of three separate light patterns in three different color components.

As indicated above, the accuracy of the color to projection angle matching operation has a major effect on the accuracy of resulting 3D images. The accuracy of the color-to-angle match, in turn, is significantly determined by the color variation rate of the projected light pattern. FIGS. 5a and 5b illustrate the concept of the error analysis—the higher the wavelength varying rate, the smaller the color mismatch error. In other words, to increase the 3D measurement accuracy, the spatially varying projection pattern that has the largest rate of variation, (e.g., the derivative of wavelength changes) should be used.

Figure 13:
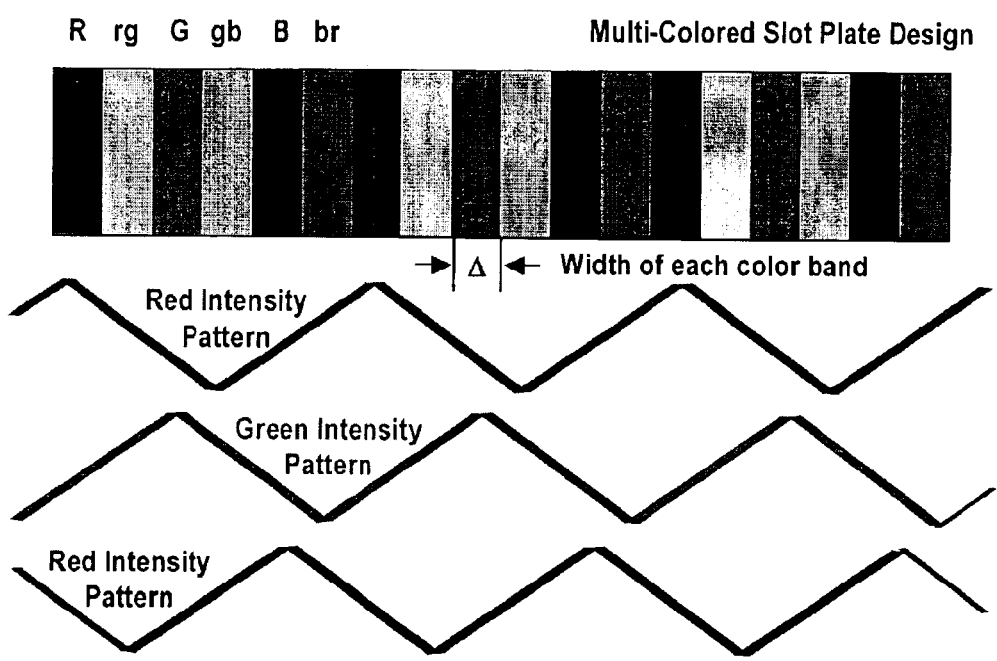
FIG. 13 is an illustration of the multi-spectra light pattern used in embodiments of the present invention.

This analysis leads to the "Multi-Rainbow Projection (MRP)" concept, as shown in FIG. 13. Instead of changing the wavelength in single cycle, a projection pattern is used in which the wavelength varies across the spectrum with the pattern being repeated several times crossing the field of view.

To implement the MRP scheme, a projector is needed that can generate the multi-rainbow illumination pattern, preferably without requiring costly color filters such as an LWVF. As indicated above, the LVWF in the Rainbow 3D camera is the main contributor to the high cost of the disclosed 3D camera system.

Figure 14:
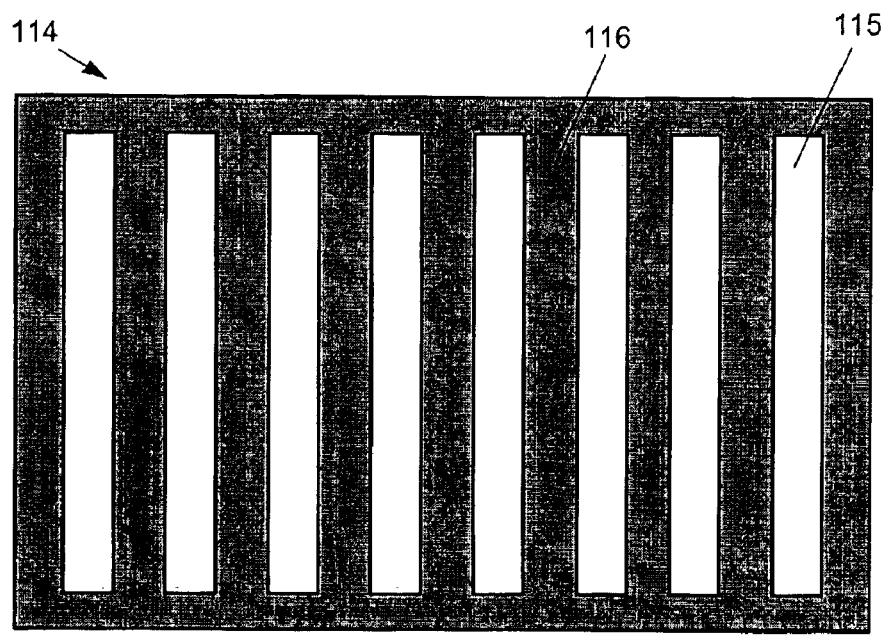
FIG. 14 illustrates a slotted plate used as pattern filter or as part of a pattern filter in some embodiments of the present invention.
Figure 15:
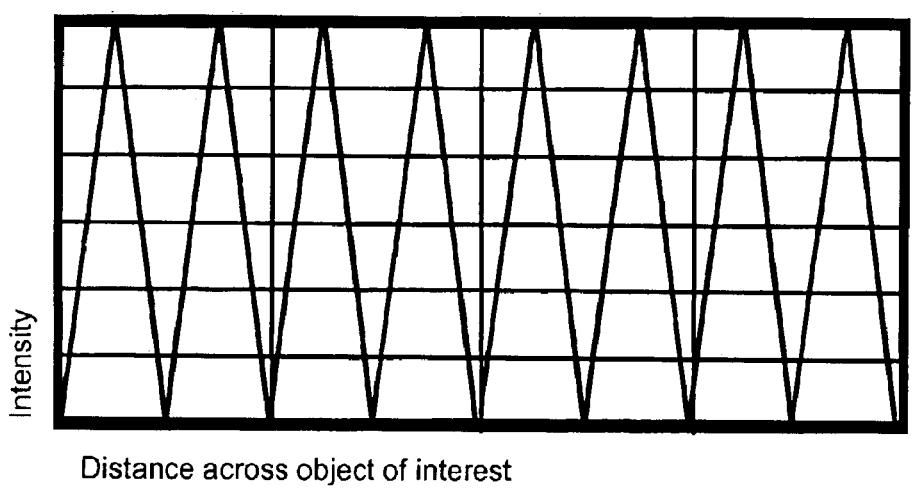
FIG. 15 is an illustrative diagram showing the manner in which the slot plane generates a spatially varying light intensity pattern.

Thus, instead of using an LWVF, a flat plate (114) with slots (115) on it, as shown in FIG. 14, may be used to generate an intensity varying illumination pattern as shown in FIG. 15. The slotted plate (114) can be made of any non-transparent material and there is no limit on the physical dimensions of the plate. In a preferred embodiment, the width of each slot (115) is made to be the same as the width of the material (116) between slots (115). FIG. 15 depicts a resulting spatially-varying intensity pattern that can be generated by using the simple slot plate (114).

The slot plate (114) discussed above is only capable of generating an intensity varying projection pattern, not a pattern that varies in color or wavelength. To implement the multi-rainbow projection (MRP) concept, we need to produce the zigzag intensity patterns for Red, Green, and Blue (Primary colors) in the projected illumination.

Figure 16A:
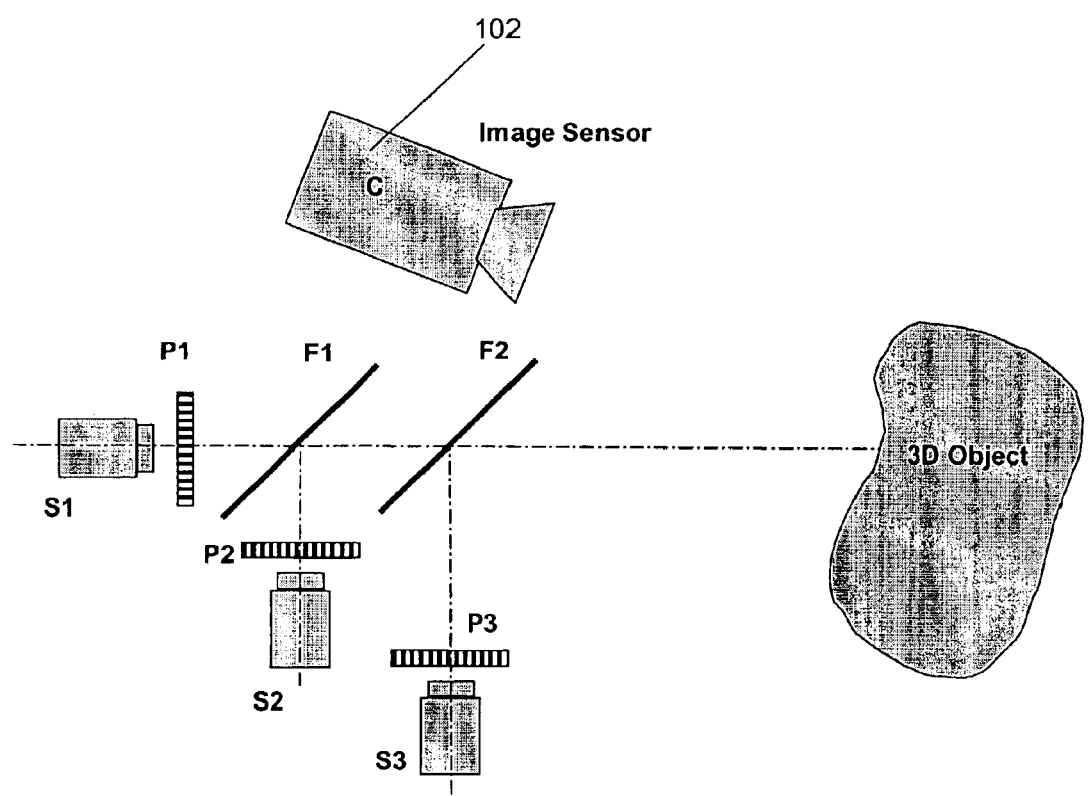
FIG. 16a is an illustration of another embodiment of a system according to the present invention in which a multiple spectra light pattern is used to generate a three-dimensional image of an object or scene.

A multiple rainbow projection pattern can be represented as a combination of three individual bands of color, namely Red, Green, and Blue (or other colors in different color space definition). Each band of color components (R, G, B) can be projected independently. These images are then combined together to form a composite "color" image. FIG. 16a illustrates this strategy.

As shown in FIG. 16a, three different light source (S1, S2 and S3) each project light onto an object of interest (3D object). The light sources (S1, S2, S3 or more) can be a single lamp or may be composed of plural independent light components, such as Light Emitting Diodes (LEDs). The light sources may also be outlets of a light transmission medium, such as a fiber optic cable, communicating with a distant light source. As will be explained more below, these light sources can be narrow spectrum components with selected wavelengths or can be wide spectrum or even white light (Lamps)

To vary the intensity of the light pattern from each source, the light may be projected through a slotted plate (P1, P2 and P3). The light from each source (S1, S2 and S3) is then directed to an object of interest (3D object). For example, one light source (S1) may be directed at the object of interest, while the light from the other two sources (S2 and S3) is redirected by a beam-splitter, mirror or half-mirror (F1 and F2) to the object of interested. The result is the desired MRP on the object of interest which can be recorded and processed as described above by a camera (102).

In some embodiment, the light of each source (S1, S2 and S3) is of a different color component. In other embodiments, each of the light sources (S1, S2 and S3) may project white light and a color filter may be provided over each of the slotted plates (P1, P2 and P3) so that light of a particular color is passed through the slots of that plate.

For example, the filtering on one plate may pass red and green light, while blocking blue light. The filtering on another plate may pass green and blue light, while blocking red light. And, finally, the filtering on another plate may pass blue and red light, while blocking green light. This arrangement has been discovered to provide color bands of equal width in the MRP projected onto the object being imaged.

Figure 16B:
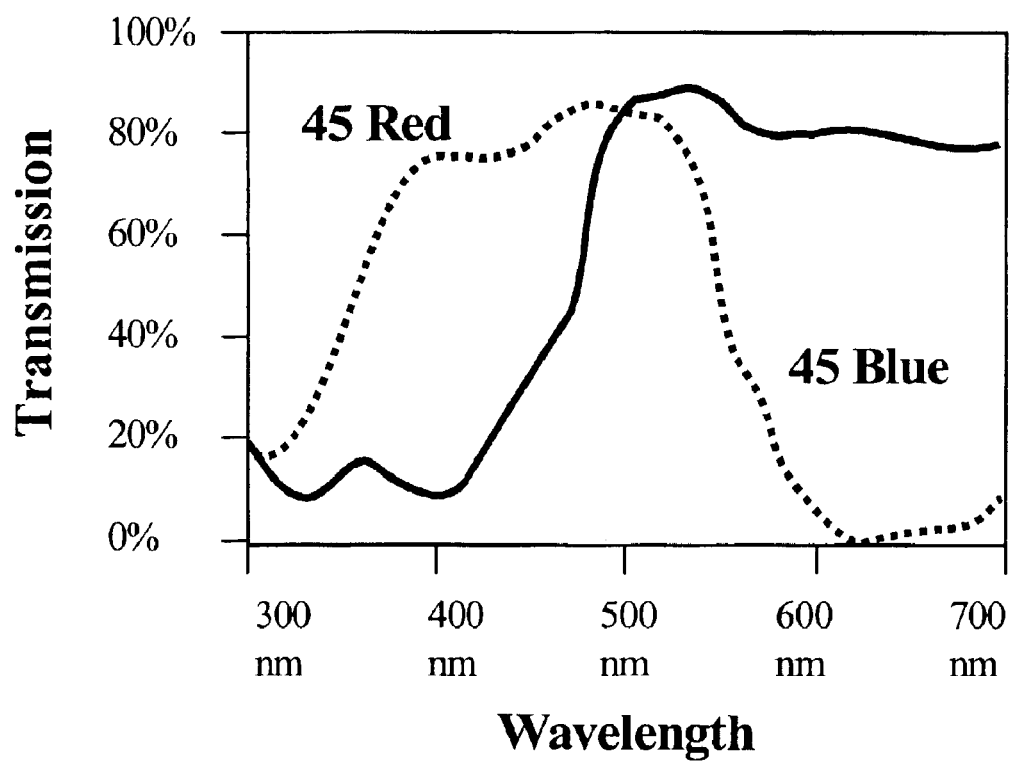
FIG. 16b is an illustration of the operation of a dichroic filter.

This same effect can also be accomplished with the use of dichroic filters in place of, or with, the mirrors (F1 and F2) or other elements that direct the light of the various light sources to the object of interest. The dichroic spectrum filters (F1 and F2) are used to combine light projections from different spectrum into a combined multi-color pattern. Typical spectrum properties of the dichroic filters are illustrated in FIG. 16b. Two colors are passed, while a third is blocked. The design and mounting configuration of the dichroic filters can be altered to fit specific applications (not necessarily 45-degree as in the illustrated example).

Alignment among multiple projection patterns is important for certain applications. Typically, for three pattern configuration, three pattern filters should be aligned such that their pattern period phases are ⅓ off with respect to each other.

Figure 17:
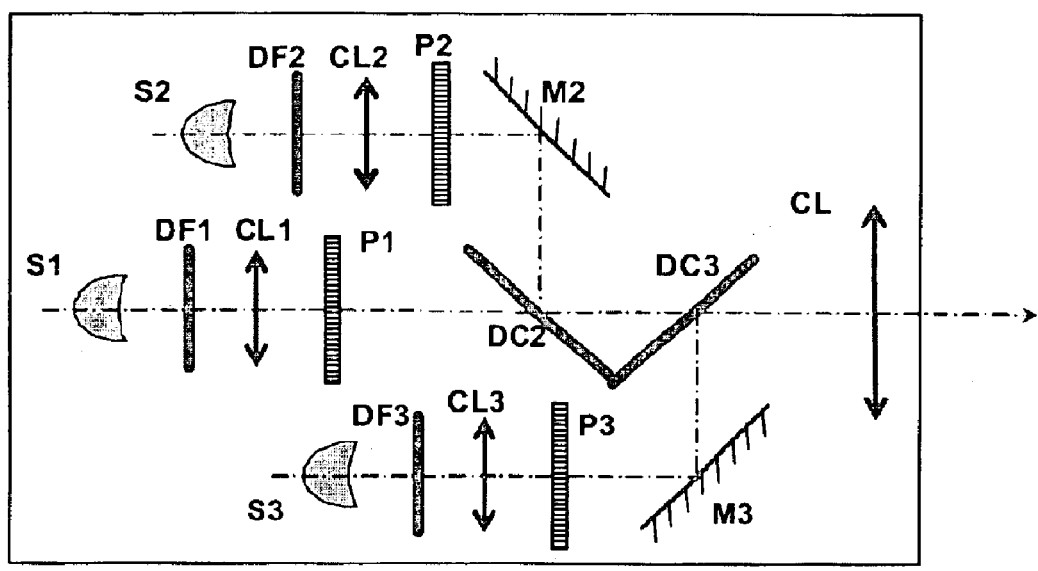
FIG. 17 is an illustration of a light source for generating a multi-spectra light pattern for use in embodiments of the present invention.

Another possible configuration for the source of the MRP is illustrated in FIG. 17. As shown in FIG. 17, three light sources (S1, S2 and S3) are used to provide three separate color components for the MRP. Each light source is covered with a diffuser (DF1–DF3). The light coming through the diffuser (DF1–DF3) then passes through a convex lens (CL1–CL2).

The light from the lens (CL1–CL2) then passes through a pattern filter (P1–P3). The pattern filter (P1–P3) may be a slotted plate as shown in FIG. 14. The pattern filter (P1–P3) give the light a pattern in which strips of light vary continuously in intensity across the width or height of the pattern. (See, FIG. 15).

The three light patterns produced by the three pattern filters (P1–P3) are then combined. This is accomplished with mirrors (M2 and M3) and dichroic filters (DC2–DC3). The dichroic filters (DC2–DC3) operate as described above. Finally, the combined patterns, each representing a different color component, or the absence of a color components, are projected onto the object or scene of interest through a projection lens (CL).

It must be remembered that using an MRP creates a situation in which there is not a one-to-one relationship between projection angle and color. Rather, a given color may be projected at several different angles depending on the number of spectra in the MRP. Therefore, additional procedures are needed for the new 3D Camera to be able to distinguish the correct projection angle from multiple candidates resulting from the one-to-many table lookup.

These procedures are discussed above with regard to FIGS. 8 and 9, and include reducing the searching range in the color search space to cover only one spectrum, i.e., on cycle of rainbow variation. Although color-angle lookup table has the one-to-many mapping property in MRP, it is possible to restrict the search space to a single cycle of rainbow variation to achieve a one-to-one correspondence. Within one cycle of the rainbow projection, the solution to matching color with projection angle becomes unique.

In restricting the search range to a single spectrum, it is useful to use an adaptive control scheme to determine the initial search point. When using a local search method in a one-to-many MRP, the outcome of the search relies heavily upon the initial condition. If a search starts within the neighborhood (e.g., the rainbow cycle) of the solution, the search can achieve a correct result. If the search starts in a point far away from the solution, the search may end up with a wrong answer.

An adaptive control scheme increases the chance of having a good initial point in a search. The initial point of a search is determined by a previously obtained correct match for a point on the object that is adjacent to the point for which range is now being determined. The underlying assumption here is that a large portion of surface of a physical object is continuous, thus the projected color is similar, and projection angle value should be very similar for adjacent points.

The algorithm starts with a known 3D point (provided by the 3D camera hardware design), and uses this point to search for the correct color matching points in its neighborhood (8 points around the starting point). It is then selects a best point among the 8 neighborhood points according to a predefined criteria to be the starting point for the next round of the search process. This recursive process is a simple and effective way to process the adaptive multi-rainbow projection calculation problem.

Figure 18:
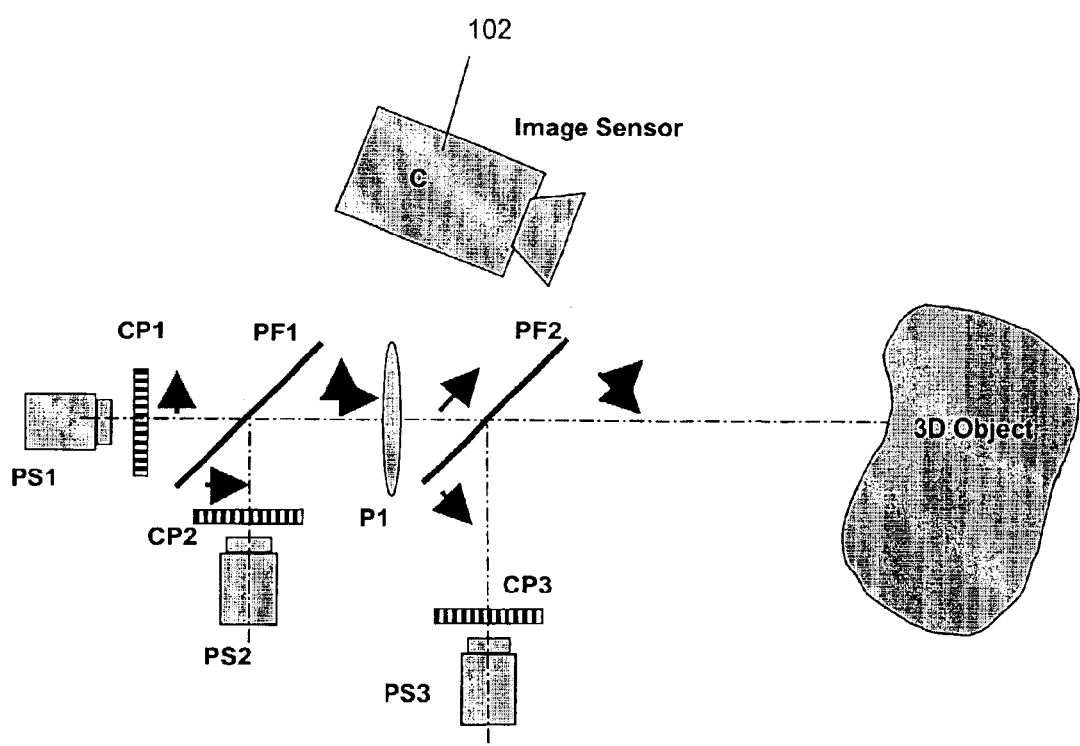
FIG. 18 is an embodiment of a multi-spectra (rainbow) light pattern projector using polarizing filters.

FIG. 18 shows an embodiment of the multi-spectra (rainbow) light pattern projector using polarizing filters. Separately placed light plural sources (PS1, PS2, PS3 or more) can be single of plural independent light components (such as LEDs) or they can be the outlets of single light source (such as optical fibers). These light sources can be narrow spectrum components with selected wavelengths (such as LED, Lasers) or can be wide spectrum or even white light (Lamps). The light sources can also include proper projection optics in order to adjust the optical projection quality. The outputs from light sources are polarized light, which could be produced by polarizing light source (such as lasers) or random polarizing light sources with polarizers.

The colored pattern filters (CP1, CP2, CP3) are used to form desirable illumination properties in each spectrum band. The purpose of the pattern filters is to produce spatially varying intensity of the illumination for each color band. One candidate of such patterns is saw-tooth wave as shown in FIG. 15. Other similar patterns can be easily implemented. The lengths of optical paths for each channel should be approximately the same. Alignment among multiple projection patterns is critical for certain applications. Typically, for three pattern configuration, three pattern filters should be aligned such that their pattern period phases are ⅓ off with respect to each other.

The polarizing filters (PF1 and PF2) are used to combine light projections from different bands. For example, the PS1 and PS2 are combined by using the PF1 based on their polarization directions. The resulting lights are of both polarization directions. A 45-degree polarizer (W1) is used to pick up light from both polarization directions. The first stage combined light now has single polarization, which can be combined with the polarization light from PS3 using the same method with that of the first one. The projected multi-spectrum pattern onto the 3D object will be imaged by an image sensor to acquire three dimensional information as described above using the camera (102).

Figure 19:
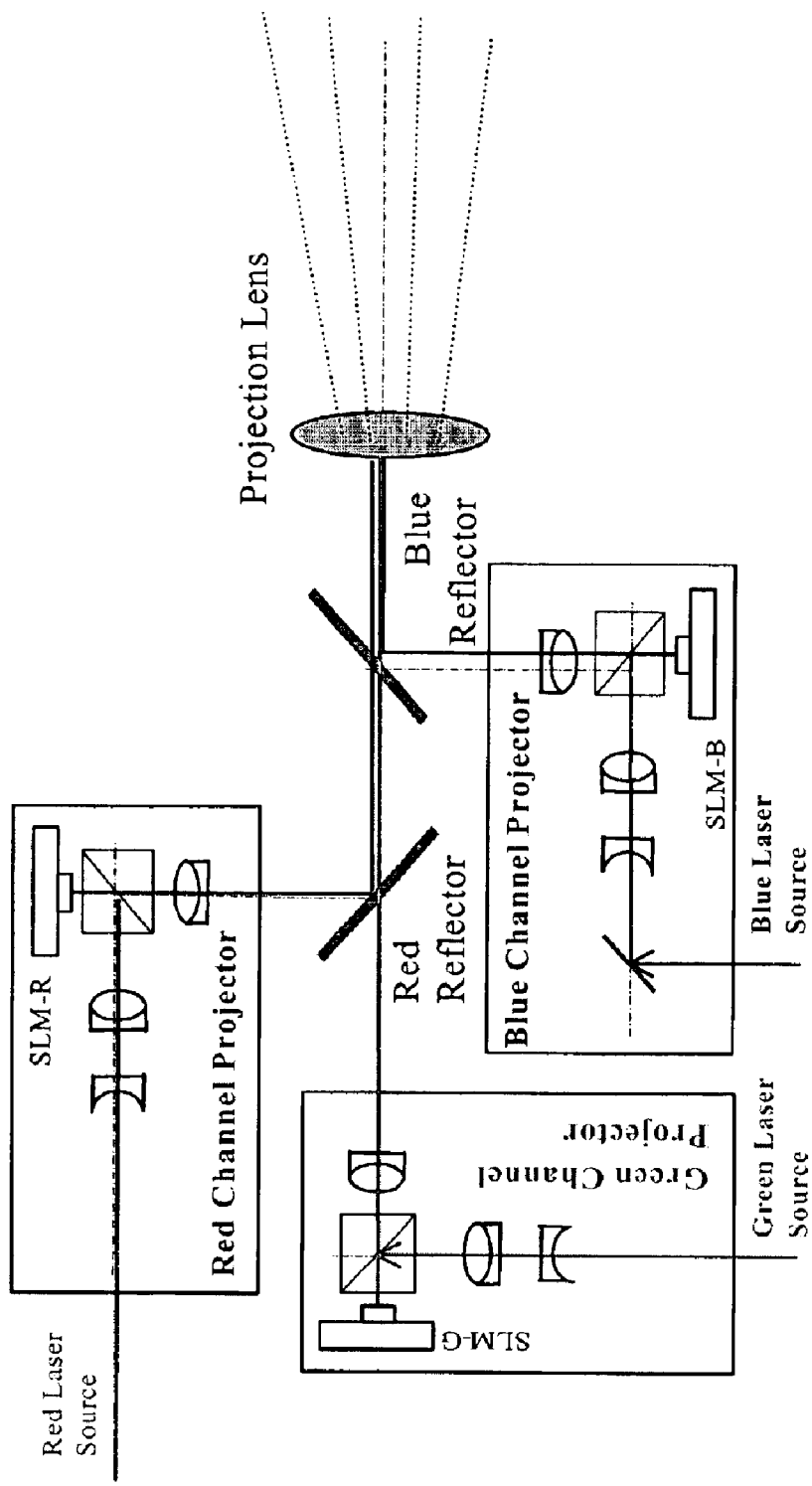
FIG. 19 shows an embodiment with projection of an arbitrary color pattern using three spatial light modulators.

FIG. 19 shows an embodiment with projection of an arbitrary color pattern using three spatial light modulators.

Figure 20:
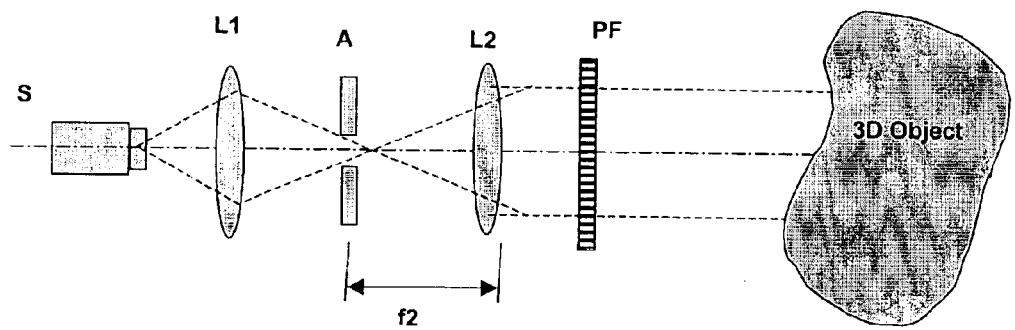
FIG. 20 shows an embodiment with a collimated light source for projecting an multi-spectra light pattern.

FIG. 20 shows an embodiment with a collimated light source for projecting an multi-spectra light pattern (MRP). The light source could be any type as described above, including LED, laser or lamp. A lens (L1) focuses the optical energy into a small diameter beam. An aperture (A) is used to eliminate unwanted peripheral, diffused light. An optical lens (L2) is placed at a focal length distance (f2) from the aperture (A). This configuration allows a conversion from a diverging beam into a parallel beam. A pattern filter is then placed in front of the parallel beam. The parallel beam is then passed through the pattern filter (PF) to generate the varying intensity pattern desired for 3D imaging applications. Due to its parallel beam projection, the resulting pattern will be projected on to object with very large depth of field.

Figure 21:
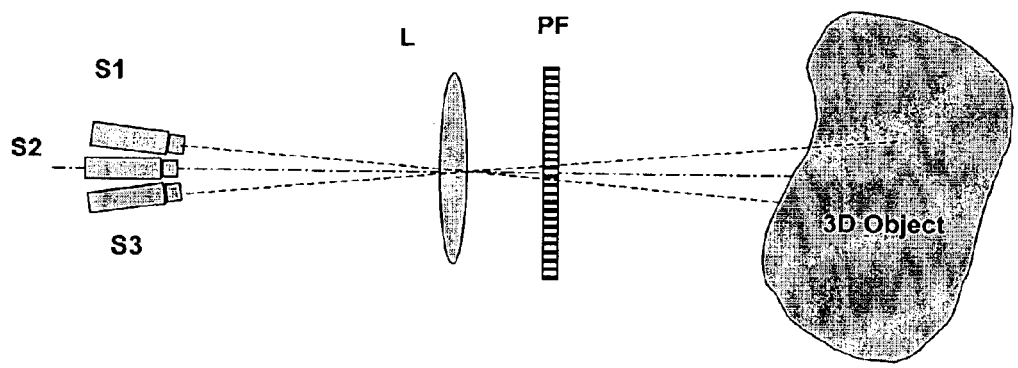
FIG. 21 shows an embodiment for projecting an multi-spectra light pattern (MRP) using a single pattern filter and multiple offset light sources.

FIG. 21 shows an embodiment for projecting an MRP using a single pattern filter and multiple offset light sources. Separately placed light plural sources (S1, S2, S3 or more) can be single light sources, plural independent light components (such as LEDs) or outlets of single light source (such as optical fibers). These light sources can be narrow spectrum components with selected wavelengths (such as LED, lasers) or can be wide spectrum or even white light (lamps). The light sources can also include proper projection optics in order to adjust the optical projection quality. The light sources themselves are designed to produce different spectrum of light projection desirable for the multi-rainbow projection.

Each light source is able to produce a single spectrum intensity varying pattern on the object using previously described approaches. The offset between multiple light sources allow for the multiple projection pattern in different spectrum bands to be offset by desirable phases (say ⅓ period).

Figure 22:
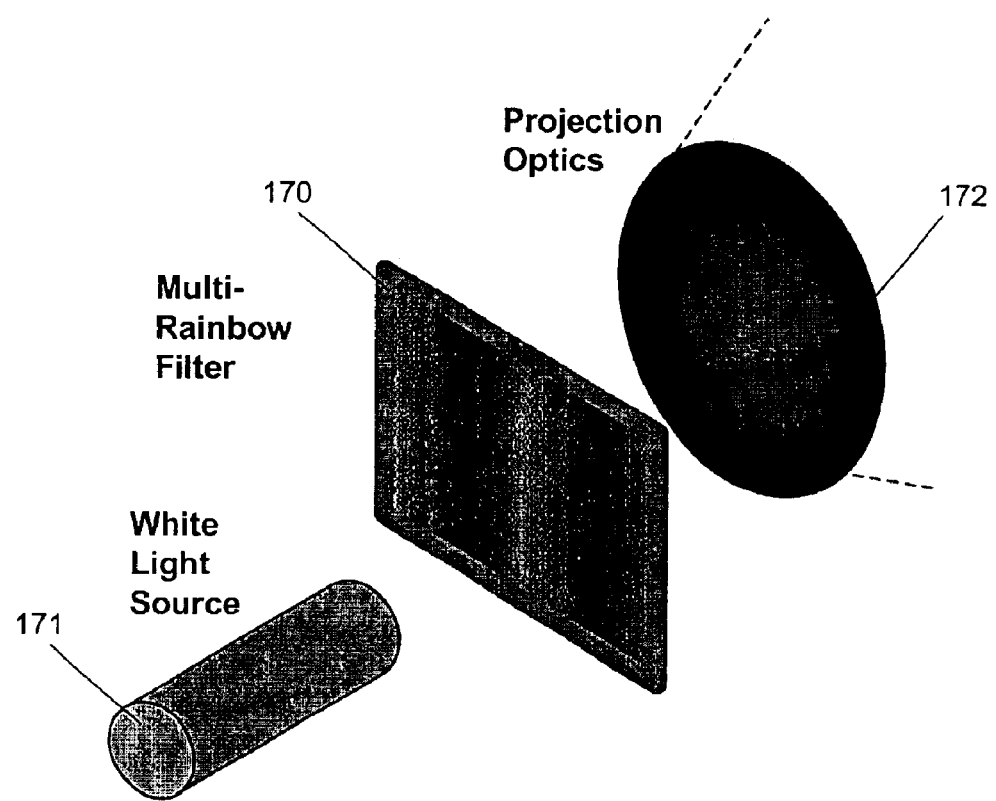
FIG. 22 illustrates another embodiment in which a multi-rainbow filter is used to project the multi-spectra light pattern.

FIG. 22 illustrates another embodiment in which a multi-rainbow filter is used. As indicated, it is preferably to eliminate the expense of an LWVF. However, it is possible to produce an MRP using an LWVF (170) as illustrated in FIG. 22 that contains multiple rainbow patterns. A white light source (171), for example, shines through the MRP-LWVF (170) to produce the desired MRP. The MRP is then illuminated on the object or scene of interest using projection optics (172).

To this point, a number of embodiments of an improved 3D imaging device have been described. We will now discuss an important application for these devices, the manufacture of custom fit hearing aids or other items to be worn in a patient's ear. Any of the embodiment described herein or in related applications for 3D imaging can be used in the following application, but the improved 3D imaging devices described herein are preferred.

More than 28 million Americans suffer from some type of hearing impairment according to statistics from National Institute on Deafness and Communication Disorders (NIDCD). It is estimated that over 260 million people are hearing impaired worldwide. Based upon the huge population involved, hearing impairment is arguably the number one disability in today's world. Fortunately, many of these people can benefit from the use of a hearing aid. However, hearing aids cannot work for everyone. Those who can be helped need to be carefully fitted in order to gain the enhanced hearing functionality.

The two basic types of hearing loss are conductive and sensorineural. Conductive hearing loss involves the outer and middle ear. It can result from a blockage of wax, a punctured eardrum, birth defects, ear infections, or heredity. Usually, conductive hearing loss can be corrected medically or surgically. Sensorineural, or "nerve" hearing loss involves damage to the inner ear. It can be caused by aging, prenatal and birth-related problems, viral and bacterial infections, heredity, trauma [such as a severe blow to the head], exposure to loud noises, the use of certain drugs, fluid buildup in the inner ear, or a benign tumor in the inner ear. Only in rare cases can sensorineural hearing loss be medically or surgically corrected. It is this type of hearing loss that is most commonly managed with a hearing aid.

A hearing aid is an electronic device that picks up sound waves with a tiny microphone. The microphone makes weaker sounds louder and sends them to the ear through a tiny speaker. Because a hearing aid is an amplification device, a person must have some hearing to benefit from its use. Hearing aids usually need to be custom-made to fit each individual patient. Because hearing loss has a variety of patterns and degrees of severity and affects people in different ways, no single hearing aid is right for everyone.

Figure 23A:
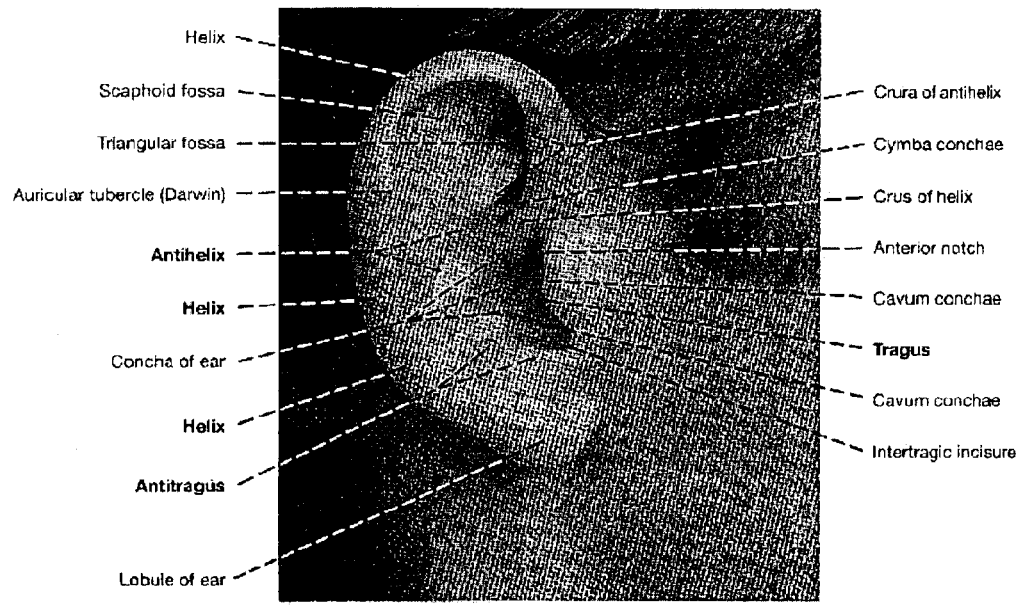
FIGS. 23a and 23b illustrate the structure and nomenclature of the human ear.
Figure 23B:
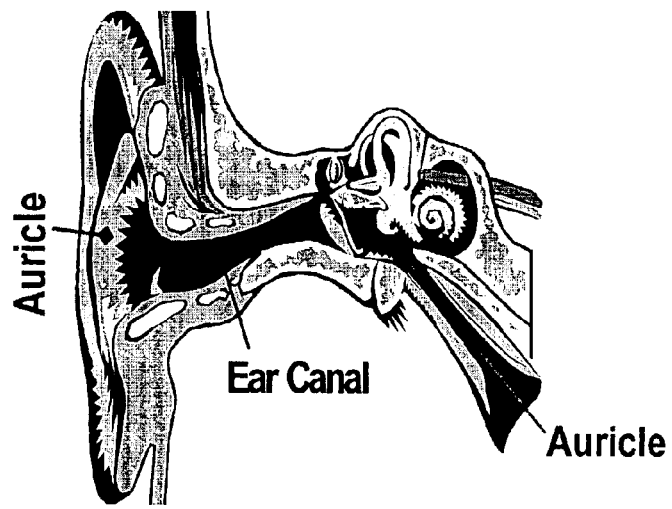

Each person has a different shape to his or her ear. The two part of the external ear are the auricle (the projecting part of the ear, consisting of skin overlaying an irregularly shaped elastic fibrocartilage), and the external acoustic meatus (the ear canal coursing through the auricle to the tympanic membrane). FIG. 23a shows the nomenclature of the auricle parts. FIG. 23b shows the cross-sectional view of the ear structure. As can be seen, the geometric shape of the auricle is complex and irregular, and no two persons would have the exact same auricle shape in common.

The geometric shape of the ear impression suggests that a 3D ear camera should have the capability to acquire images that cover both the auricle and the canal areas that can be used in place of a physical impression. Image registration techniques are also needed to put multiple un-calibrated images together seamlessly to generate complete digital ear impression that can replace the traditional physical impression.

There are five common models for hearing aids in the market: behind-the-ear (BTE); in-the-ear (ITE); in-the-canal (ITC); mini-canal (MC); and completely-in-the-canal (CIC). Each requires a different shell design and fabrication technique. As indicated, however, the shell of each hearing aid needs to be custom-made to fit the shape of the individual's ear. The custom-fit is crucial to patients for ensuring both the comfort and operability of the hearing aid.

The geometric fit of the hear aid is defined as the close matching between the shape of an external ear and/or ear canal and the shell of the hearing aid. Poorly fitted shell shape creates serious problems in the performance and comfort of the hearing aid. For example, the user cannot attach the device on his or her ear. If the shape of the hearing aid shell does not match closely with its user's ear shape, there would be not enough frictional force to retain the device in its proper position. This may also create discomfort or pain. A close fit creates a comfortable wearing experience.

Additionally, the close fit of the hearing aid shell is not only for comfortable wearing, but also for ensuring the hearing aid's functional performance. If the shell cannot seal the internal ear chamber from the outside, interference between inner and outer air vibration will occur and the performance of the hearing aid will be severely deteriorated.

The current manufacturing process for custom-fit shells of hearing aids is a highly labor-intensive and manual process. Moreover, the quality control of the fitting/performance of hearing aids is difficult. The custom-fitting process starts with taking an ear impression of a patient at the office of an audiologist or hearing aid dispenser. The impression is taken with a soft material that can conform to and then represent the shape of the patient's ear and/or canal.

The impression is then shipped to manufacturer's laboratory. Each shell has to be custom-made by skilled technicians using manual techniques. The quality and consistency of the fitting vary significantly with the technician's skill level. A typical process of producing a shell takes about 40 minutes from start to finish. Once the shell is finished, electrics will be installed, calibrated, and a quality check will typically be performed. The hearing aid device will then be sent back to the audiologist or dispenser who will try the device on the patient. If for any reason the hearing aid device does not fit well (only 75% fit well in the first installation), this lengthy, costly, and uncomfortable process will have to be repeated.

Conventional hearing aid fabrication procedures suffer major problems from audiologists' viewpoint (1) the process of taking an ear impression is very uncomfortable to most patients; (2) the impression procedure exerts force to on ear structures that may cause deformation of those structures which affects the measurement accuracy, thus affects the quality of fitting; (3) it is very difficult for the audiologist to obtain an immediate feedback on the quality of the impression, until the second appointment; (4) physical handling of impressions requires a sterilization process (to eliminate contamination); and (5) an ear impression only records 3D ear shapes in a solid mold.

The manual fabrication process also suffers major drawbacks from hearing aid manufacturers' viewpoint: (1) the manual and time-consuming fabrication process is not scalable for mass production; (2) the mailing of physical impressions from dispensers to manufacturers takes several days to deliver; (3) there is a lack of consistency of quality, resulting in a high level of products that have to be remade or are returned; and (4) there is a shortage of skilled worker and a long training time to train a new worker.

To address these issues, any of the 3D cameras described herein can be used as a 3D ear camera that enables audiologists to acquire single or multiple 3D images of the external ear (auricle) and ear canal and to produce a complete 3D digital ear model that serves as a "digital ear impression." The digital ear impression data can then be sent instantly to a manufacture's lab via the Internet, for example, thereby reducing dramatically the delivery time.

The digital impression enables the hearing aid manufacturers to take advantages of the latest breakthroughs of computer-aided-design (CAD) and computer aided manufacturing (CAM) technologies, including rapid prototyping, to produce a customized hearing aid device within, for example, a one-day time frame. After the 3D model of a custom-fit hearing aid shell is obtained, the data will be converted into the format that can be easily input to a CAD software package. The post processing and shell design will be performed. There are commercial CAD/CAM software packages that can perform such a design job, such as SolidWorks and AutoCAD. Special software also is offered by a company such as Raindrop Geomagic, NC.

The basic design steps are as follows: (1) obtain 3D point data from the 3D camera; (2) form the geometric surface; (3) cut the base; (4) trim the canal tip; (5) round the tip; (6) thicken the shell; (7) create the vent; and (8) create the hole. The completed design of the custom-fit shell is then sent to the rapid prototype (RP) machine for fabrication. The technology of RP production is quite mature and easily accessible. For example, using the RP machine from the leading provider 3D Systems, the shell can be built directly using the biocompatible materials.

Even including the quality assurance, electronics calibration, and shipping of the hearing-aid device, the entire process of making a custom-fit hearing aid device would be shortened from weeks to a few days. More importantly, the digital impression technology improves the quality of fit, thus enhance the hearing functionality for impaired people. This process is illustrated in FIG. 24.

Figure 24:
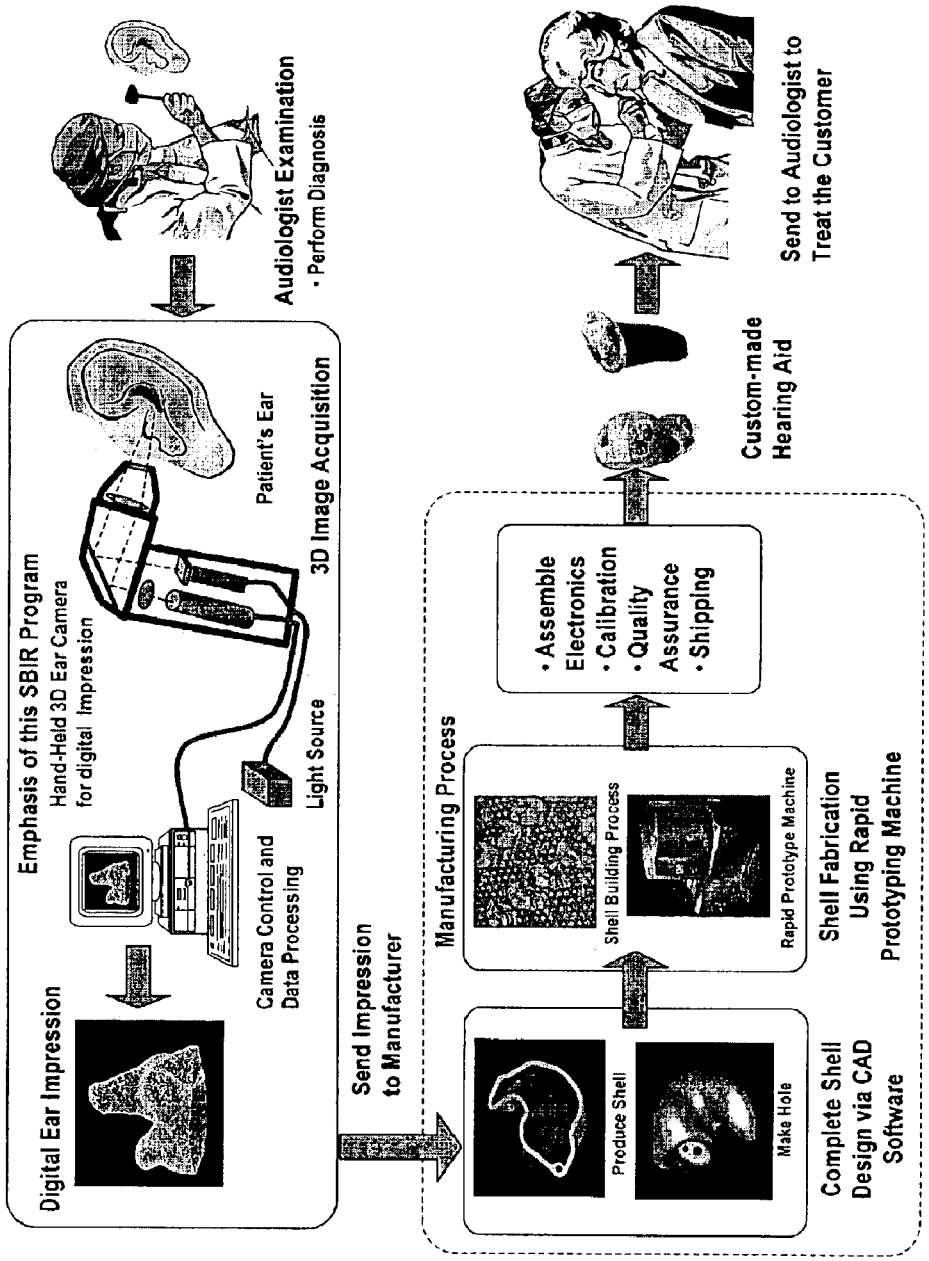
FIG. 24 illustrates a system in which a digital representation of the ear is made with a 3D camera for use in the production of a custom-fit hearing aid.

FIG. 24 illustrates the concept of the "digital audiology" technology paradigm for custom-fit hearing aid device prescription and fabrication. The hearing aid prescription and fabrication system consists of three major modules:

1. A handheld 3D Ear Camera and 3D image processing module that provides Digital Ear Impression directly from patient's ear;
2. CAD (Computer-Aided-Design) shell design software for custom fit hearing aid devices;
3. A CAM machine, such as a rapid prototyping machine, that can take the CAD file and fabricate the custom-designed shells directly without molding.

The assembly of the electronics, the calibration of the electronics and the tailoring of the electronics response can then proceed.

Within the three major components, CAD software has been an active R&D area in the past decades, and commercial software packages and visualization tools (SolidWorks, AutoCAD, eShell, etc) are currently available. A number of CAM fabrication systems (such as 3D Systems SLA, Stratisys) are currently in the commercial market, thanks to the rapid technology advances and commercialization in the Rapid Prototyping industry. This specification provides the handheld 3D ear camera for taking the "Digital Ear Impression".

Figure 25:
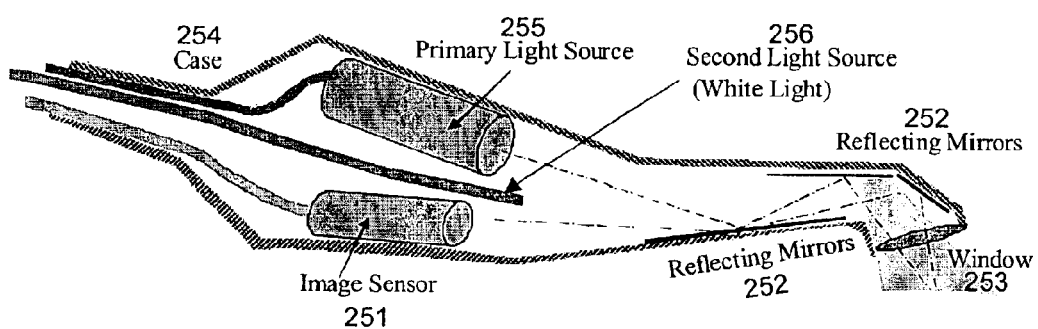
FIG. 25 is an illustration of a 3D camera for use in the system illustrated in FIG. 24.

On exemplary embodiment for the proposed 3D Ear Camera is illustrated in FIG. 25. Inside an ergonomically styled case (254) is a specially designed 3D Camera. To keep a compact dimension, a miniature color CCD image sensor (251) is used to collect both 2D and 3D images of the ear. A set of optical lenses and a reflecting mirror (252) are used to direct the light ray from a window (253) at the tip of the casing (254) to the CCD camera (251). The narrow neck of the casing (254) allows an easy access inside a patient's ear and the convenience of taking 3D measurement of a complex surface profile. The multi-rainbow light projection is generated through an optical fiber bundle (255). Detailed optics design will be performed to ensure a reasonable length of baseline.

There is a second independent light source (256) in the 3D ear camera. By turning off the rainbow source (255) and turning on the ordinary diverging white light source (256), the camera can take 2D images with accurate color representation of ear. This enables the ear camera to output a "textured 3D digital model" of the ear. This 3D modeling capability can be extended to building a comprehensive 3D database of ear structures for interactive virtual reality (VR) surgical simulation applications. As indicated above, the 3D ear model can be transferred over the Internet. Therefore the powerful 3D ear digitization capability provides a needed tool for ear surgery planning, tele-consultation, and education/training of audiologists/surgeons. Adding the second light source feature also allows the camera to also be used as a standard 2D camera for audiologists, enhancing its marketability.

Since the 3D ear camera is a handheld device, it is therefore unrealistic to expect that the multiple images acquired by a user contain any accurate geometric calibration information with respect to each other. Thus, the 3D ear camera system includes a set of robust algorithms and software able to automatically register multiple 3D images of the same ear acquired by the 3D ear camera to produce a complete 3D ear model. There are a number of commercial software packages available that will provide this functionality, such as the Videobrush software developed by Sarnoff.

Seamless registration of multiple un-calibrated 3D images is among the most difficult problems in the field of advanced 3D surface imaging technology, yet it is a critical and indispensable step leading to practical applications of the 3D camera. Conventional methods of 3D image integration rely on the pre-calibrated camera positions to align multiple 3D images, and require extensive ad hoc manual routines to merge the aligned 3D images into a complete 3D model.

Ideally, intelligent 3D image registration software could register a number of 3D images without the need of any prior knowledge of the cameras used to generate the images or their placement. Such a system works under the premise that the problem of integrating multiple 3D images can be considered as a sequence of 3D registration problems dealing with only a pair of 3D images. For example, one can start registering a pair of 3D images (say I1 and I2) within a given set of N frames of 3D images. After completing the integration of I1 and I2, the obtained 3D image becomes a new I1 image that is ready for registering with the I3 image. This process continues until all N images are integrated into a complete 3D ear model.

After a pair of 3D images is selected, the system will perform certain pre-processing for the 3D images to ensure their quality. Pre-processing operations include 3D image filtration, "bad 3D data" elimination, and "cutting off" the unreliable or undesired areas. The pre-processed 3D image pair is then sent to the image alignment module. Alignment of a pair 3D images is based solely upon the 3D surface features (such as surface curvature) that are independent from any coordinate system definition or illumination conditions. Once the corresponding points are found in the overlapping areas between two images, a 4×4 homogenous coordinate transformation is performed to align one image with the other in a global coordinate system.

The next step is to merge (i.e., blend) two aligned 3D images to form a uniformed 3D data set. Two images are usually not in the same spatial resolution, and the sampling of 3D surface data is not in the same grid orientation. The problem is exacerbated by noise in the data and errors in the alignment. A "resembling" procedure based on the Fuzzy Logic principle generates a uniformed 3D surface and blends the boundary areas. A 3D image merged from two "raw" images then becomes a new 3D image ready for the next integration process.

The process of registering pairs of 3D images continues by selecting the next "best" 3D image to integrate. The new image should overlap an area in the existing 3D image. This process continues until all the "raw" 3D images are processed and merged.

The 3D registration does not stop here. After getting a complete 3D model from multiple 3D images, the system enters into the "post-processing" stage to further enhance quality of 3D modeling. The 3D model will be compressed to the detail level specified by the user. Miscellaneous editing functions of 3D model will be necessary to fill holes and perform final touch to the 3D model. The 2D texture and color overlay will also be performed as an option to give the 3D model a more realistic look. Finally, a 3D visualization tool will be available that allows users to assess the 3D registration results and extract useful parameters from the completed 3D ear model.

For a more detailed explanation of the integration of a plurality of 3D images, please refer to Applicant's U.S. patent application Ser. No. 09/617,867, filed Jul. 17, 2000 and which is incorporated herein by reference in its entirety.

Figure 26:
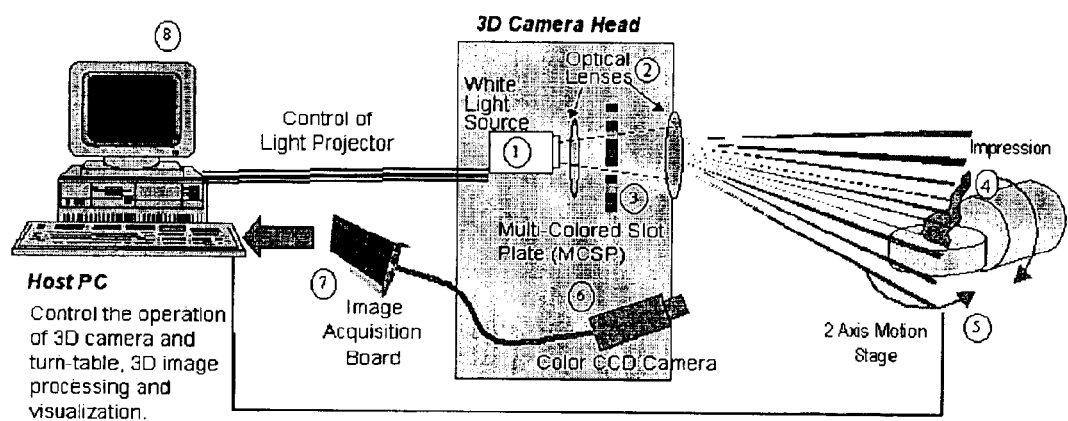
FIGS. 26 and 27 illustrate alternative systems in which a physical impression of the ear is made and then imaged with a 3D camera for production of a custom-fit hearing aid.
Figure 27:
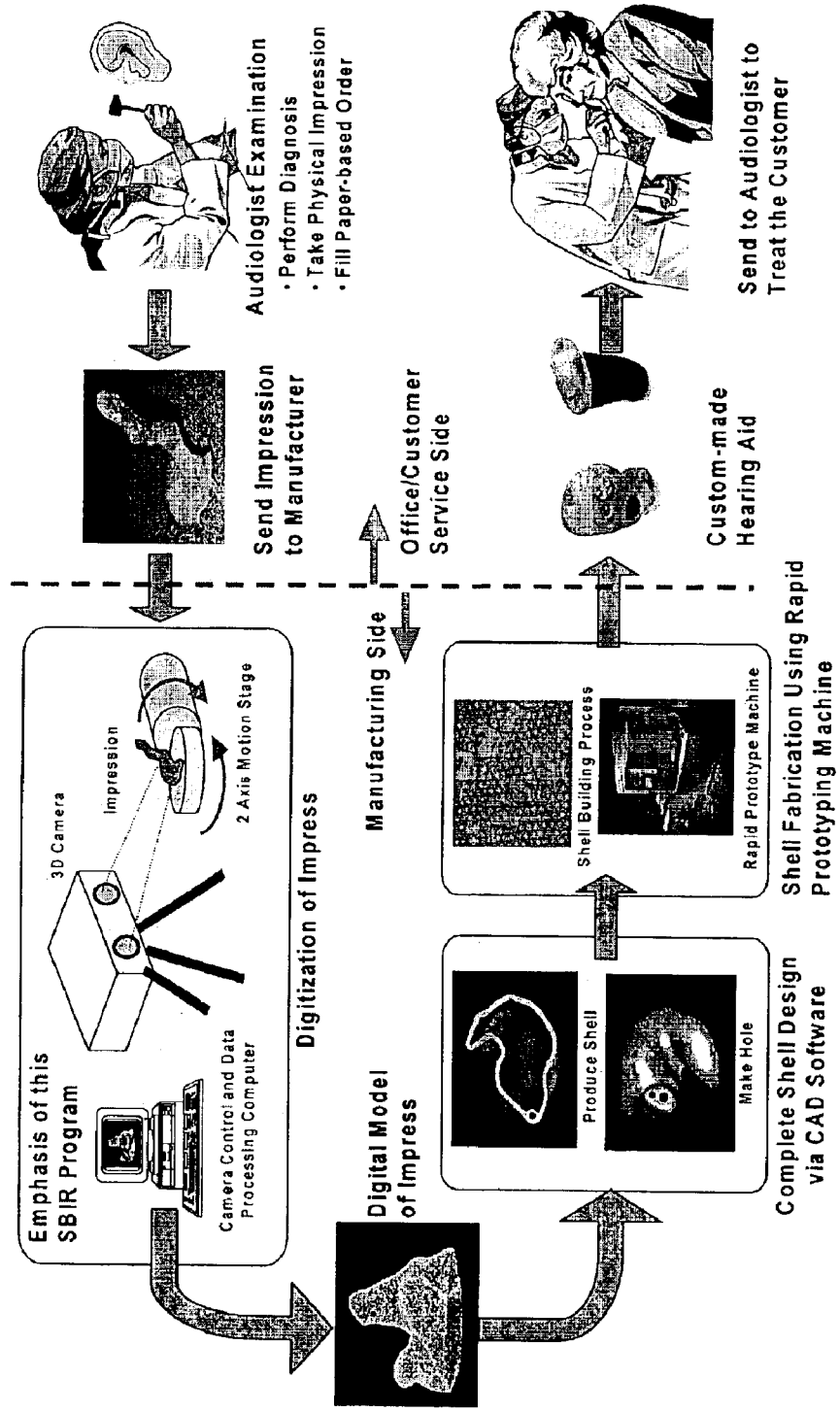

FIGS. 26 and 27 illustrate two other possible embodiments of the present invention. While there are advantages to entirely eliminating the user of a physical impression of the ear, it is still possible to take a physical impression and then use a 3D camera to image the impression. The 3D model of the impression can then be used with CAD/CAM systems as described above to rapidly manufacture the desired custom-fit hearing aid. Both FIGS. 26 and 27 illustrate systems in which a physical impression of the ear is imaged by a 3D camera system.

In summary, the proposed 3D ear camera for custom-fit hearing aid will provide a revolutionary advance in the hearing aid industry. The implementation of the 3D ear camera would lead to quality enhancement of care to the hearing impairment population, customer satisfaction and lower return rate for hearing aid manufacturers. The novel 3D ear camera technology disclosed herein fills in the gap of the digital audiology paradigm.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A system for generating a three-dimensional (3D) image of an object or scene, said system comprising:
    a plurality of light sources wherein each light source produces a repeating pattern of light which varies spatially in intensity, wherein each light source produces said repeating pattern of light in a different color;
    a projection system for combining light patterns from each of said light sources and projecting a combined pattern on said object; and
    an imaging system for imaging said object as illuminated by said combined pattern, wherein said imaging system calculates a range to points on said object.

2. The system of claim 1, wherein said imaging system determines a projection angle of light projected onto said points on said object by correlating reflected light color with projection angle.

3. The system of claim 1, wherein each of said light sources comprises a pattern filter.

4. The system of claim 3, wherein each said pattern filter comprises a slotted plate.

5. The system of claim 3, wherein each said pattern filter comprises a color filter.

6. The system of claim 1, wherein said projection system comprises at least one beam-splitter.

7. The system of claim 1, wherein said projection system comprises at least one dichroic filter.

8. The system of claim 1, wherein said projection system comprises a lens.

9. The system of claim 1, wherein each of said light sources comprises a diffuser and a lens.

10. The system of claim 1, wherein said projection system comprises at least one mirror.

11. The system of claim 1, wherein said projection system comprises at least one polarizer.

12. A system for generating a three-dimensional (3D) image of an object or scene, said system comprising:
    a plurality of light sources wherein each light source produces light in a different color;
    a projection system for projecting light from each of said light sources on said object, said projection system comprising a pattern filter for combining said light from said light sources to produce a pattern of light with spatially varying wavelength including multiple iterations of the color spectrum; and
    an imaging system for imaging said object as illuminated by said pattern of light, wherein said imaging system calculates a range to points on said object.

13. The system of claim 12, wherein said projection system comprises at least one lens.

14. The system of claim 12, wherein said pattern filter comprises a slotted plate.

15. The system of claim 12, wherein said imaging system determines a projection angle of light projected onto said points on said object by correlating reflected light color with projection angle.

16. A system for generating a three-dimensional (3D) image of an object or scene, said system comprising:
    a white light source;
    a projection system for projecting light from said light source on said object, said projection system comprising a multi-spectrum filter for filtering light from said light source to produce a pattern of light with spatially varying wavelength including multiple iterations of the color spectrum; and
    an imaging system for imaging said object as illuminated by said pattern of light, wherein said imaging system calculates a range to points on said object.

17. The system of claim 16, wherein said multi-spectrum filter comprises a multi-spectrum linear variable wavelength filter.

18. The system of claim 16, wherein said multi-spectrum filter comprises a slotted plate.

19. The system of claim 18, wherein said projection system comprises an aperture.

20. A method for generating a three-dimensional (3D) image of an object or scene, said method comprising:
    producing a repeating pattern of light which varies spatially in intensity with a plurality of light sources wherein each light source produces said repeating pattern of light in a different color;
    combining light patterns from each of said light sources and projecting a combined pattern on said object;
    imaging said object as illuminated by said combined pattern; and
    calculating a range to points on said object.

21. The method of claim 20, wherein calculating range comprises determining a projection angle of light projected onto said points on said object by correlating reflected light color with projection angle.

22. The method of claim 20, wherein producing said repeating pattern comprises using a pattern filter for each of said light sources.

23. The method of claim 22, wherein each said pattern filter comprises a slotted plate.

24. The method of claim 22, wherein each said pattern filter comprises a color filter.

25. The method of claim 20, wherein combining said light patterns comprises using at least one dichroic filter.

26. The method of claim 20, wherein combining said light patterns comprises using at least one polarizer.

27. A method for generating a three-dimensional (3D) image of an object or scene, said method comprising:
    generating light with a plurality of light sources wherein each light source produces light in a different color;
    projecting light from each of said light sources on said object through a single pattern filter for combining said light from said light sources to produce a pattern of light with spatially varying wavelength including multiple iterations of the color spectrum;
    imaging said object as illuminated by said pattern of light; and
    calculating a range to points on said object.

28. The method of claim 27, wherein said pattern filter comprises a slotted plate.

29. The method of claim 27, wherein calculating range comprises determining a projection angle of light projected onto said points on said object by correlating reflected light color with projection angle.

30. A method for generating a three-dimensional (3D) image of an object or scene, said method comprising:
- filtering light from a white light source to produce a pattern of light with spatially varying wavelength including multiple iterations of the color spectrum;
- projecting said pattern of light on said object;
- imaging said object as illuminated by said pattern of light; and
- calculating a range to points on said object.

31. The method of claim 30, wherein said filtering is performed with a multi-spectrum filter.

32. The method of claim 30, wherein said filtering is performed with a slotted plate.

33. The method of claim 32, further comprising collimating said light before said filtering.

34. A system for generating a three-dimensional (3D) image of an object or scene, said system comprising:
- means for producing a repeating pattern of light which varies spatially in intensity with a plurality of light sources wherein each light source produces said repeating pattern of light in a different color;
- means for combining light patterns from each of said light sources and projecting a combined pattern on said object;
- means for imaging said object as illuminated by said combined pattern; and
- means for calculating a range to points on said object.

35. The system of claim 34, wherein said means for calculating range comprise means for determining a projection angle of light projected onto said points on said object by correlating reflected light color with projection angle.

36. The system of claim 34, wherein said means for producing a repeating pattern comprises using a pattern filter for each of said light sources.

37. The system of claim 36, wherein each said pattern filter comprises a slotted plate.

38. The system of claim 34, wherein said means for combining said light patterns comprises using at least one dichroic filter.

39. The system of claim 34, wherein said means for combining said light patterns comprises using at least one polarizer.

40. A system for generating a three-dimensional (3D) image of an object or scene, said system comprising:
- means for generating light with a plurality of light sources wherein each light source produces light in a different color;
- means for projecting light from each of said light sources on said object through a single pattern filter for combining said light from said light sources to produce a pattern of light with spatially varying wavelength including multiple iterations of the color spectrum;
- means for imaging said object as illuminated by said pattern of light; and
- means for calculating a range to points on said object.

41. The system of claim 40, wherein said pattern filter comprises a slotted plate.

42. The system of claim 40, wherein said means for calculating range comprise means for determining a projection angle of light projected onto said points on said object by correlating reflected light color with projection angle.

43. A system for generating a three-dimensional (3D) image of an object or scene, said system comprising:
- means for filtering light from a white light source to produce a pattern of light with spatially varying wavelength including multiple iterations of the color spectrum;
- means for projecting said pattern of light on said object;
- means for imaging said object as illuminated by said pattern of light; and
- means for calculating a range to points on said object.

44. The system of claim 43, wherein said means for filtering comprise a multi-spectrum filter.

45. The system of claim 43, wherein said means for filtering comprise a slotted plate.

46. The system of claim 45, further comprising means for collimating said light before said filtering.

* * * * *